US012807167B2

(12) United States Patent
Sahni et al.

(10) Patent No.: US 12,807,167 B2
(45) Date of Patent: Nov. 24, 2026

(54) PATH MODELING

(71) Applicant: NVIDIA Corporation, Santa Clara, CA (US)

(72) Inventors: Anjandeep Singh Sahni, Sunnyvale, CA (US); Weizhao Shao, Santa Clara, CA (US); Jie Li, San Jose, CA (US); Hae-Jong Seo, Campbell, CA (US)

(73) Assignee: NVIDIA Corporation, Santa Clara, CA (US)

( * ) Notice: Subject to any disclaimer, the term of this patent is extended or adjusted under 35 U.S.C. 154(b) by 51 days.

(21) Appl. No.: 18/817,938

(22) Filed: Aug. 28, 2024

(65) Prior Publication Data

US 2026/0062018 A1 Mar. 5, 2026

(51) Int. Cl.

| | |
|---|---|
| ***B60W 50/06*** | (2006.01) |
| ***B60W 60/00*** | (2020.01) |
| ***G06T 7/246*** | (2017.01) |
| ***G06T 7/277*** | (2017.01) |
| ***G06T 7/64*** | (2017.01) |

(52) U.S. Cl.

CPC .......... *B60W 50/06* (2013.01); *B60W 60/001* (2020.02); *G06T 7/246* (2017.01); *G06T 7/277* (2017.01); *G06T 7/64* (2017.01); *B60W 2420/408* (2024.01); *B60W 2552/05* (2020.02); *G06T 2207/10028* (2013.01); *G06T 2207/30256* (2013.01)

(58) Field of Classification Search

None

See application file for complete search history.

(56) References Cited

U.S. PATENT DOCUMENTS 11,676,364 B2 6/2023 Xu et al.
2019/0202453 A1* 7/2019 Farooqi ................ B60W 40/112
2021/0166052 A1* 6/2021 Park ....................... G06F 18/214
2021/0333302 A1* 10/2021 Ma .......................... G01P 13/00
2023/0205219 A1 6/2023 Towal et al.
2023/0214654 A1 7/2023 Park et al.
2023/0234580 A1* 7/2023 Reichardt ......... B60W 60/0027 701/27
2024/0124017 A1 4/2024 Han et al.
2024/0239374 A1 7/2024 Nister et al.
2024/0317217 A1* 9/2024 Choi ................. B60W 60/0015
2025/0002086 A1* 1/2025 Choi .................. B62D 15/0255

FOREIGN PATENT DOCUMENTS

DE 102025133475 A1 3/2026

* cited by examiner

*Primary Examiner* — Shayne M. Gilbertson
(74) *Attorney, Agent, or Firm* — IRON SUMMIT IP LLP

(57) ABSTRACT

In various examples, geometries associated with one or more paths in an environment may be efficiently tracked and/or predicted using recursive models. For instance, the disclosed systems and methods may use Kalman filters to track and predict control points corresponding to Bezier curves (e.g., 2D and/or 3D Bezier curves). The Bezier curves may be representative of geometries associated with one or more lanes of a driving surface. In some instances, multiple Bezier curves may be used to represent a geometry of a lane, and multiple Kalman filters may be used to track and predict control points for each Bezier curve. For instance, an edge of the lane may be represented using a first Bezier curve, and control points for the first Bezier curve may be tracked and predicted using multiple Kalman filters (e.g., for a 3D Bezier curve, one Kalman filter for each x, y, or z dimension).

20 Claims, 14 Drawing Sheets

PATH MODELING

BACKGROUND

Designing a system to drive a vehicle or machine autonomously without supervision at a level of safety required for practical acceptance is tremendously difficult. For instance, an autonomous or semi-autonomous vehicle should at least be capable of performing as a functional equivalent of an attentive driver—who draws upon a perception and action system that has an incredible ability to identify and react to dynamic and static obstacles in a complex environment—to avoid colliding with other objects or structures along its path. As such, among the most important tasks required of an autonomous system is determining drivable paths within complex environments that an autonomous vehicle may encounter.

However, conventional systems for determining drivable paths for autonomous vehicles within an environment may be sub-optimal due to the complexities associated with predicting and tracking drivable paths. For instance, some conventional systems may only be capable of detecting or tracking drivable paths in two-dimensional (2D) space, which is less than ideal since autonomous systems need to operate in real-world, three-dimensional (3D) environments. Additionally, some conventional systems may rely on various different types of data to make accurate path predictions. For instance, several different modalities such as LiDAR data, RADAR data, and/or other types of sensor data may be necessary to accurately predict or track paths in an environment. Because of this, the conventional systems may be computationally expensive and/or inefficient due to having to process such vast data inputs.

Additionally, some conventional systems may use deep learning or other techniques to generate a polyline that represents a path for a vehicle. However, to generate the polyline, a large number of points that represent the polyline are determined using the deep learning, such as hundreds and/or even thousands of points. As a result, polyline representations may be inefficient to generate and, in some cases, may be over-parameterized and/or over-complex compared to standard road construction designs, or may require a large number of network parameters, which may lower generalization capacity. In some instances, other conventional systems may use particle filtering for tracking drivable paths in an environment. However, particle filtering can be inefficient and not suitable for autonomous driving and/or other real-time applications.

SUMMARY

Embodiments of the present disclosure relate to tracking multi-dimensional path geometry for autonomous or semi-autonomous systems and applications. For instance, systems and methods described herein may use recursive models to efficiently track and/or predict geometries associated with paths in an environment. For instance, the disclosed systems and methods may use Kalman filters and/or other recursive models to track and predict control points corresponding to Bezier curves (e.g., 2D and/or 3D Bezier curves), which may be representative of geometries associated with one or more lanes of a driving surface. In some instances, the systems and methods of the present disclosure may use multiple Bezier curves to represent the geometry of a lane, and may also use multiple Kalman filters to track and predict control points for each Bezier curve. For example, an edge or a midline of the lane may be represented using a first Bezier curve, and control point coordinates for the first Bezier curve may be tracked and predicted using multiple Kalman filters (e.g., for a 3D Bezier curve, one Kalman filter for each x, y, or z dimension/coordinate). In some examples, the systems may compute a curve shifting matrix for shifting previous states of the Kalman filters to an ego machine origin, and then predict new states of the Kalman filters by multiplying the previous states by the curve shifting matrix. In this way, the systems may implement a closed form solution to apply the curve shifting matrix and generate the predictions (in the Kamal Filtering processes) using the states from previous timestamps and relative ego motion between the two timestamps.

In contrast to conventional systems, the systems of the present disclosure, in some embodiments, are able to efficiently and precisely represent drivable path geometry in 2D and/or 3D space using Bezier representations, as well as further optimize the techniques by being able to track each dimension of a given Bezier representation independently. For instance, by using Kalman filtering with efficient state representations and closed form motion models, the systems of the present disclosure are able to provide more optimized tracking of path geometry than conventional systems, such as those described above that may use particle filtering. Additionally, in contrast to conventional systems, the systems of the present disclosure, in some embodiments, are able to perform 3D lane tracking while relying on minimal input data, such as image-based lane detection data. By being able to rely on minimal input data and still perform 3D lane tracking, the systems of the present disclosure may be more optimally suited for autonomous driving and other real-world applications while improving computational efficiency by processing less input and other data.

BRIEF DESCRIPTION OF THE DRAWINGS

The present systems and methods for tracking multi-dimensional path geometry for autonomous or semi-autonomous systems and applications are described in detail below with reference to the attached drawing figures, wherein.

DETAILED DESCRIPTION

Figure 1:
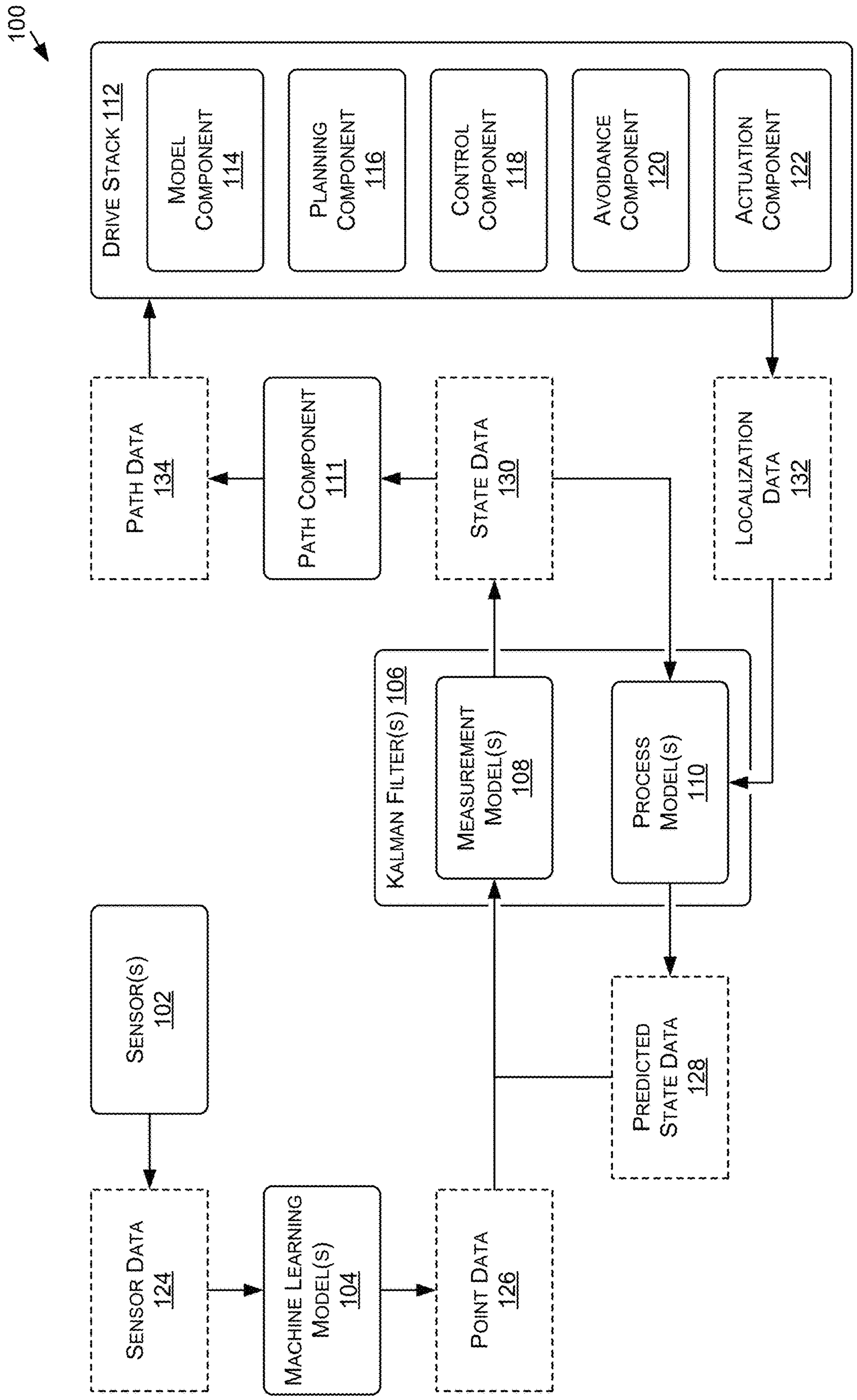
FIG. 1 illustrates an example data flow diagram for a process of tracking multi-dimensional path geometry using Kalman filters, in accordance with some embodiments of the present disclosure.

Systems and methods are disclosed related to tracking three-dimensional (3D) path geometry for autonomous or semi-autonomous systems and applications. Although the present disclosure may be described with respect to an example autonomous or semi-autonomous vehicle or machine 800 (alternatively referred to herein as "vehicle 800," "ego-vehicle 800," "ego-machine 800," or "machine 800," an example of which is described with respect to FIGS. 8A-8D), this is not intended to be limiting. For example, the systems and methods described herein may be used by, without limitation, non-autonomous vehicles or machines, semi-autonomous vehicles or machines (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to predicting and tracking driving lane geometry in autonomous or semi-autonomous systems and applications, this is not intended to be limiting, and the systems and methods described herein may be used in augmented reality, virtual reality, mixed reality, robotics, security and surveillance, autonomous or semi-autonomous machine applications, and/or any other technology spaces where predicting and tracking geometry of features is performed.

For instance, a system(s) may receive sensor data generated using one or more sensors associated with a vehicle (e.g., a machine, an "ego vehicle," etc.), such as a semi-autonomous and/or autonomous vehicle. As described herein, in some examples, the sensor data may include image data generated using one or more image sensors, such as one or more cameras of the vehicle, or may include LiDAR data, RADAR data, ultrasonic data, and/or other data types generated using any number of sensor modalities. For example, where image data is used, the image data may be generated using a front-facing image sensor(s) of the vehicle, where the image data represents one or more images depicting an environment in front of the vehicle and/or in a direction that the vehicle is substantially navigating. In some examples, the system(s) may then process the sensor data using one or more processing techniques, which are described in more detail herein.

The system(s) may then input the sensor data (and/or the processed sensor data) into one or more machine learning models that are configured to generate data associated with one or more paths (e.g., lanes, roads, etc.) for the vehicle to navigate. For instance, based at least on processing the sensor data (and/or the processed sensor data), the machine learning model(s) may generate a first output indicating points (e.g., Bezier points, or control points) associated with one or more paths. As described herein, the one or more paths may include, but are not limited to, a first path that the vehicle is to navigate, one or more second paths that are adjacent to the first path (e.g., one or more paths that are to the left of the first path and/or one or more paths that are to the right of the first path), and/or one or more other paths, such as an exit path, a merge path, a lane split path, a path of opposing traffic, and/or so forth. Additionally, for a path, the first output may include any number of points such as, but not limited to, two points, four points, eight points, twelve points, sixteen points, twenty points, fifty points, and/or any other number of points. As described herein, in some examples, such as to reduce the computing resources needed to generate the path(s) and/or to reduce the latency in generating the path(s), the number of points for a path may be limited to a threshold number of points and/or a threshold number of points per distance of the path.

Additionally, in some examples, based at least on processing the sensor data (and/or the processed sensor data), the machine learning model(s) may generate a second output indicating one or more classifications associated with the points and/or the path(s). As described herein, a classification may include, but is not limited to, a vehicle or ego path (e.g., the path that the vehicle is to navigate), an adjacent path, a left-adjacent path, a right-adjacent path, an edge path, a left-edge path, a right-edge path, a midline path, a lane center path, an exit path, a merge path, a lane split path, an opposing traffic path, and/or any other type of path. In some examples, the second output may indicate a respective classification for each point and/or each path. Additionally, or alternatively, in some examples, the second output may indicate one or more probabilities associated with one or more classifications for each point and/or each path.

The system(s) (e.g., the machine learning model(s), one or more postprocessing components, etc.) may then use the first output to determine one or more curves or other geometric representations associated with the path(s). For example, and for a path, the system(s) may use one or more algorithms to generate a Bezier curve based at least on the points associated with the path. As described herein, in some examples, an algorithm may include a curve fitting algorithm such as, but not limited to, a 2D Bezier curve fitting algorithm, a 3D Bezier curve fitting algorithm, a cubic Bezier curve fitting algorithm, a higher order Bezier curve fitting algorithm, a split wise Bezier curve fitting algorithm, any other type of Bezier algorithm, another type of curve fitting algorithm, etc. Additionally, or alternatively, in some examples, an algorithm may include another type of curve-fitting algorithm that is configured to generate a curve based at least on the points associated with the path. The system(s) may then use similar processes to generate a respective curve (e.g., Bezier curve) or other geometric representation associated with one or more (e.g., each) of the other path(s).

As described herein, the system(s) may use one or more recursive models to track the curves and/or the points output by the machine learning model(s) that are used by the system(s) to determine the curves or other geometric representations. The recursive models may also be used to temporally smooth the curves by making predictions based on previous states associated with the curves/points. For instance, the system(s) of the present disclosure may use one or more Kalman filters to maintain (e.g., track, predict, etc.) various sets of points corresponding to the paths in the environment. While many of the examples of the present disclosure are described with respect to using Kalman filters to track path geometry, these are just a few examples, and the system(s) of the present disclosure may track and predict path geometry using any other types of recursive models, algorithms, and techniques.

In some instances, the system(s) may use multiple curves to represent the geometry of a given path. For instance, the geometry of a left edge of a path may be represented using a first curve, the geometry of a right edge of the path may be represented using a second curve, the geometry of a midline or center path of the lane may be represented using a third curve, etc. Additionally, because the system(s) of the present disclosure may track and predict path geometry in multi-dimensional space (e.g., 2D, 3D, etc.), the system(s) may use multiple Kalman filters to maintain different state vectors for different dimensions of the curves. That is, for an individual curve, the number of Kalman filters and state vectors used to maintain that curve may be equal to, in some examples, the number of dimensions (e.g., 2D, 3D, etc.) associated with the curve and/or the points.

As an example, locations of control points in 3D space may be represented using three coordinate values—such as an x-coordinate, a y-coordinate, and a z-coordinate—and the geometry of a given curve may be defined using a number of the 3D control points (e.g., 12 points per curve). As such, and in the case of 3D points for a 3D curve, the system(s) may use three Kalman filters to maintain three different state vectors for each curve (e.g., one state vector for each x-, y-, and z-coordinate dimension), and the state variables of the state vectors may correspond to the values of the 3D control points for that dimension. For instance, and for a first curve (of potentially multiple curves) corresponding to a first path (of potentially multiple paths), the system(s) may use a first Kalman filter to maintain (e.g., track and predict) first control point dimensions (e.g., x-coordinate values) for the first curve, a second Kalman filter to maintain second control point dimensions (e.g., y-coordinate values) for the first curve, and a third Kalman filter to maintain third control point dimensions (e.g., z-coordinate values) for the first curve.

In some examples, the system(s) may track and predict geometries associated with multiple paths in an environment simultaneously. For instance, the system(s) may maintain one or more first Kalman filters to track and predict geometry for a first path in the environment, maintain one or more second Kalman filters to track and predict geometry for a second path in the environment, maintain one or more third Kalman filters to track and predict geometry for a third path in the environment, and so forth. That is, the one or more first Kalman filters may be used to track and maintain one or more first sets of 3D control points for one or more first Bezier curves representing 3D geometry of the first path, the one or more second Kalman filters may be used to track and maintain one or more second sets of 3D control points for one or more second Bezier curves representing 3D geometry of the second path, the one or more third Kalman filters may be used to track and maintain one or more third sets of 3D control points for one or more third Bezier curves representing 3D geometry of the third path, and so forth.

In some examples, the Kalman filters may include at least process models and measurement models. The process models (also referred to as "prediction models") of the Kalman filters may be configured to predict current states (e.g., next states) of the Kalman filters based at least on previous states of the Kalman filters and relative motion of a machine between the previous states and the current states. The measurement models of the Kalman filters may be configured to use various data sources to update or refine the predicted current states of the Kalman filters. For instance, the measurement models may use sensor data, outputs of machine learning models, or any other information to update or refine the predicted state vectors.

As described herein, the process models of the Kalman filters may, in some instances, use an optimized, closed form solution to generate predicted Bezier curve states using relative machine motion. For example, as the machine moves from a previous location to a current location, the system(s) may use the process models of the Kalman filters to predict the next states of the Bezier curves based on the previous states and the machine motion. In some instances, the process models may update the tracked states (e.g., previous states) using data indicating a relative motion of the machine between a current timestamp associated with the current states (e.g., state vectors) and a previous timestamp associated with the previous states to generate one or more "transformed previous states." The process models may then, in some instances, use one or more curve shifting matrices to shift the transformed previous states to the machine's center (e.g., origin) and match the DNN measured Bezier curve(s). In other words, to predict the Bezier curve for the current or next time step, the system(s) may multiply the transformed previous states by the curve shifting matrix.

For example, to derive the process model and/or the curve shifting matrix, the system(s) may transform the previous state(s) of the Kalman filter (e.g., the control points for the previous time step) to "ego-motion transformed" states by applying a rigid body transformation to each control point of the previous state(s). However, because DNN measurements roughly start at 2 meters ahead of the machine (e.g., ego-vehicle) for every frame, the previous state(s) control points may be shifted backwards relative to DNN measurements for a current time step depending on how far the ego machine has traveled forward. As such, the system(s) may sample a plurality of polyline points using the Bezier curve(s) from the previous state(s) to determine a current location of the machine with respect to the polyline points/Bezier curve. That is, the system(s) may determine a polyline point of the plurality of polyline points that corresponds to the current location of the machine and/or just ahead of the machine (e.g., approximately 2 meters ahead) where the DNN measurements roughly begin. The system(s) may use the polyline points in front of the current location of the machine to determine one or more predicted sets of control points corresponding to predicted Bezier curves for the current or next time step that begin and end more closely with the DNN measurements.

In various examples, the measurement models of the Kalman filters may obtain the predicted current state vectors from the process models and update or refine the current state vectors using, for instance, sensor data representing actual measurements associated with the paths, machine learning model outputs indicating predicted points associated with the paths based on the sensor data, or any other types of data. For instance, the measurement models may obtain the current state vectors including first control point values corresponding to first predicted curves associated with the paths. The measurement models may also obtain outputs from the machine learning models indicating second control point values corresponding to second predicted curves associated with the paths. The measurement models may then fuse, combine, average, etc. the first control point values and the second control point values to update the current state vectors.

The system(s) may then use the updated current state vectors to determine one or more geometries associated with the paths. For instance, the system(s) may determine one or more Bezier curves associated with the paths using the updated current state vectors, and the Bezier curves may be indicative of 3D geometry associated with the various paths in the environment. The system(s) may then cause performance of one or more operations associated with the machine based at least on the geometries. For instance, the system(s) may select a path for the machine to follow, plan a trajectory for the machine to follow, alter one or more behavior parameters of the machine based on the geometry of the path (e.g., increase or decrease speed for paths with inclines or declines, increase or decrease speed based on path curvature, etc.), or any other operations.

In some embodiments, the systems and methods described herein may be performed within a simulation environment (e.g., NVIDIA's DriveSIM) using simulated data (e.g., simulated sensor data of simulated sensors of a virtual or simulated machine). For example, simulated sensor data may be used (e.g., processed using one or more machine learning models, neural networks, etc.) to identify, detect, and/or classify lane lines, road boundary lines, other lines, vertical structures/features, etc. within the simulation environment using points of a curve and/or one or more curve fitting algorithms, and may use this information to perform operations (e.g., control, navigation, planning, etc. operations) associated with the virtual machine within the environment. These simulated operations may be used to test performance of the underlying algorithms, systems, and/or processes prior to deploying them in the real-world. In some instances, the simulation may be used to generate synthetic training data—e.g., training data including regions of interest and/or sub-regions of interest from within the simulation. In some embodiments, other methods may be used in addition or alternatively from a simulation to generate synthetic training data. For example, the synthetic training data may be generated using neural rendering fields (NERFs), Gaussian splat techniques, diffusion models, electrostatic models (e.g., Poisson flow generative models (PFGMs), etc. The synthetic training data (in addition to or alternatively from real-world data) may then be processed to determine geometry, curvature, semantic information, classification information, and/or other information related to features of interest, such as lines, longitudinal features (e.g., poles), and/or other features within a driving environment, a warehouse, etc., for example.

In any example, such as where a simulation environment is used for testing, validation, training, etc., the simulation environment and/or associated training data may be rendered or otherwise generated using one or more light transport algorithms-such as ray-tracing and/or path-tracing algorithms. In some embodiments, the simulation environment and/or one or more objects, features, or components thereof may be generated or managed within a three-dimensional (3D) content collaboration platform (e.g., NVIDIA's OMNIVERSE) for industrial digitalization, generative physical AI, and/or other use cases, applications, or services. For example, the content collaboration platform or system may include a system that uses universal scene descriptor (USD) (e.g., OpenUSD) data for managing objects, features, scenes, etc. within a simulated environment, digital environment, etc. The platform may include real physics simulation, such as using NVIDIA's PhysX SDK, in order to simulate real physics and physical interactions with simulations hosted by the platform. The platform may integrate OpenUSD along with ray tracing/path tracing/light transport simulation (e.g., NVIDIA's RTX rendering technologies) into software tools and simulation workflows for building, training, deploying, or testing AI systems—such as systems for testing, validating, training (e.g., machine learning models, neural networks, etc.), and/or other tasks related to automotive, robot, machine, or other applications.

In some embodiments, teleoperation or remote control of a vehicle or other machine may be performed using a remote control or teleoperation system. For example, the systems and methods described herein may be used to identify lane lines, road boundary lines, longitudinal features, etc. that may be included in a visualization or mapping of an environment to aid a remote operator in controlling—or providing waypoints or other indications of control or navigation—an autonomous or semi-autonomous machine through an environment.

The systems and methods described herein may be used by, without limitation, non-autonomous vehicles or machines, semi-autonomous vehicles or machines (e.g., in one or more adaptive driver assistance systems (ADAS)), autonomous vehicles or machines, piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems implementing language models, such as large language models (LLMs), vision language models (VLMs), and/or multi-modal language models, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems for performing generative AI operations, systems implemented at least partially using cloud computing resources, and/or other types of systems.

With reference to FIG. 1, FIG. 1 illustrates an example data flow diagram for a process 100 of tracking multi-dimensional path geometry using Kalman filters, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 800 of FIG. 8A-8D, example computing device 900 of FIG. 9, and/or example data center 1000 of FIG. 10.

The process 100 may be implemented using, amongst additional or alternative components, a sensor(s) 102, a machine learning model(s) 104, a Kalman filter(s) 106 including at least a measurement model(s) 108 and a process model(s) 110, and a drive stack 112, which may include one or more of a model component 114, a planning component 116, a control component 118, an avoidance component 120, and/or an actuation component 122.

As an overview, the process 100 may include applying, to the machine learning model(s) 104, sensor data 124 generated using the sensor(s) 102. The machine learning model(s) 104 may output point data 126 based at least on the sensor data 124. The process model(s) 110 of the Kalman filter(s) 106 may use state data 130 from a previous state of the Kalman filter(s) 106 and localization data 132 associated with a machine to determine a predicted next state (or "current state") of the Kalman filter(s) 106, which may be represented using the predicted state data 128. The measurement model(s) 108 of the Kalman filter(s) 106 may use the point data 126 from the machine learning model(s) 104 to update or refine the predicted state data 128 and generate the state data 130 representative of the current state of the Kalman filter(s) 106. The path component 111 may then use the state data 130 to generate path data 134 representative of geometry associated with a path in an environment. The drive stack 112, which may be associated with a machine, such as the machine 800, may use the path data 134 to cause the machine to perform one or more operations.

The process 100 may include the machine learning model (s) 104 receiving one or more inputs, such as the sensor data 124 generated using the sensor(s) 102, and generating one or more outputs, such as the point data 126 representing points associated with one or more paths. In some examples, the sensor data 124 may include image data generated using one or more image sensors (e.g., one or more cameras) of a machine. In some examples, the sensor data 124 may additionally, or alternatively, include other types of sensor data, such as LiDAR data generated using one or more LiDAR sensors, RADAR data generated using one or more RADAR sensors, and/or so forth.

Figure 2:
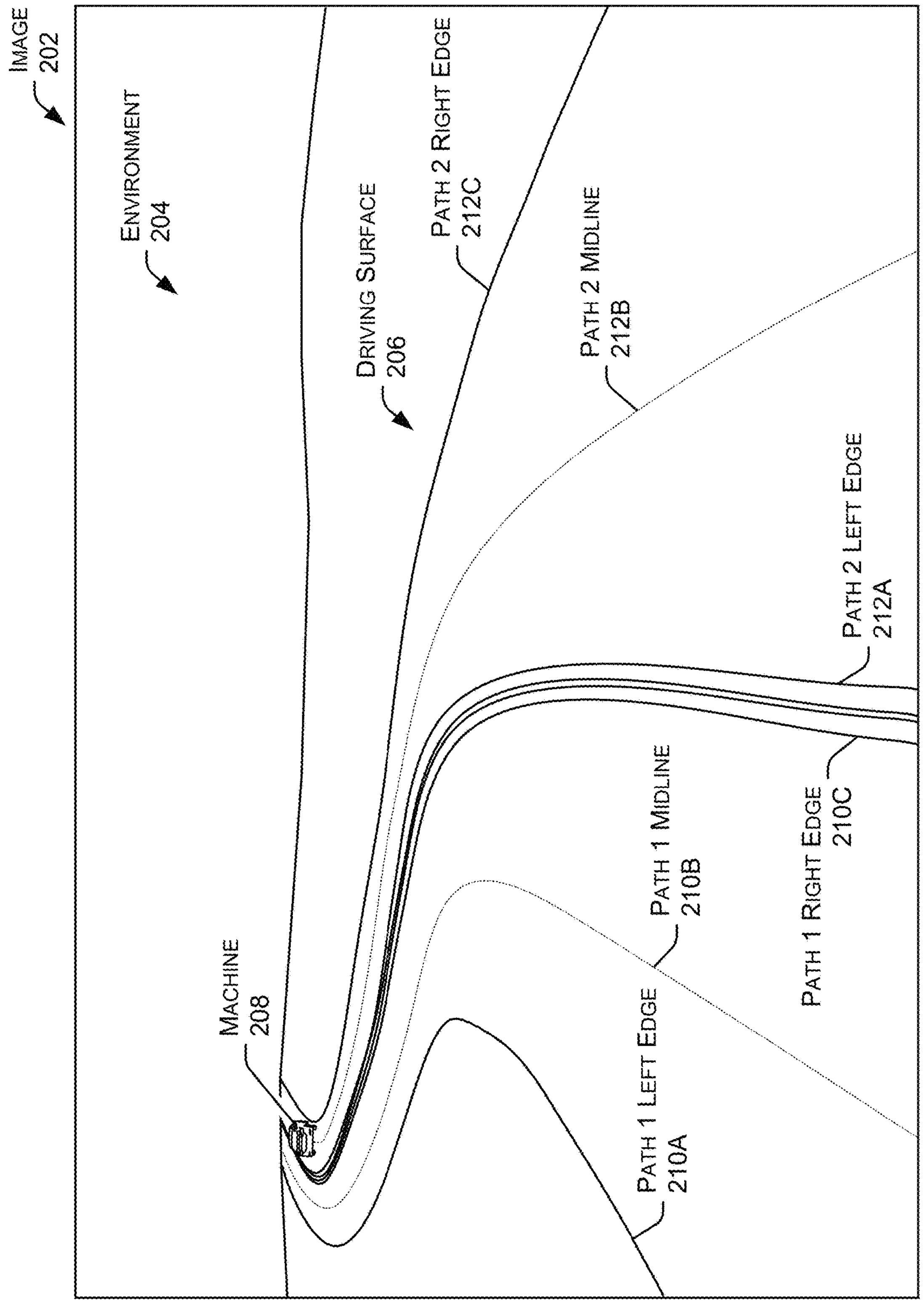
FIG. 2 illustrates an example image of drivable paths in an environment, in accordance with some embodiments of the present disclosure.

For instance, FIG. 2 illustrates an example of image data representing an image 202 associated with drivable paths in an environment 204, in accordance with some embodiments of the present disclosure. As shown, the image 202 may depict one or more lanes of a driving surface 206 in the environment 204, as well as a machine 208 that is operating on the driving surface 206. The driving surface 206 depicted in the example of FIG. 2 includes two paths (e.g., lanes) separated by a double solid line and annotated as the path labels-a left path 210 (e.g., path 1) and a right path 212 (e.g., path 2). While the example of FIG. 2 includes the driving surface 206 as having two paths, in other examples, the driving surface 206 may include any number of paths (e.g., 1, 2, 3, 4, 5, 6, 7, etc.) and the system(s) disclosed herein may track and predict geometries for any number of the paths. The path label(s) may include edges or midlines (also referred to herein as "center paths") of the paths, such that a left edge 210A, a midline 210B, and a right edge 210C delineate the path 210 and a left edge 212A, a midline 212B, and a right edge 212C delineate the path 212.

As described above and herein, the system(s) may maintain multiple curves for each path of the driving surface 206. That is, the machine learning model(s) 104 may predict point data 126 for curves (e.g., Bezier curves) corresponding to one or more (e.g., each) of the left edges 210A and 212A, the midlines 210B and 212B, and/or the right edges 210C and 212C of the paths 210 and 212. Additionally, the system(s) may use one or more of the Kalman filter(s) 106 to track and/or predict states (e.g., state vectors including the point data) for the curves corresponding to the left edges 210A and 212A, the midlines 210B and 212B, and/or the right edges 210C and 212C of the paths 210 and 212. For instance, the system(s) may use three of the Kalman filter(s) 106 to maintain three state vectors for a curve corresponding to the midline 210B of the path 210 (e.g., path 1), such as one Kalman filter and one state vector for each control point dimension. That is, the system(s) may use a first Kalman filter to maintain a first state vector for x-coordinates of the control points for the curve, a second Kalman filter to maintain a second state vector for y-coordinates of the control points for the curve, and a third Kalman filter to maintain a third state vector for z-coordinates of the control points for the curve.

Referring back to the example of FIG. 1, in examples where the sensor data 124 includes image data, the image data may include data representative of images (such as the image 202 described above) of a field of view of one or more image sensors of the machine, such as stereo camera(s), wide-view camera(s) (e.g., fisheye cameras), infrared camera(s), surround camera(s) (e.g., 360 degree cameras), long-range and/or mid-range camera(s), and/or other camera type of the machine. In some examples, the image data may be captured by a single image sensor with a forward-facing, substantially centered field of view with respect to a horizontal axis (e.g., left to right) of the machine. The image data captured from this perspective may be useful for perception when navigating—e.g., within a lane, through a lane change, through a turn, through an intersection, etc.—because a forward-facing image sensor may include a field of view that includes both a current lane of travel of the machine, an adjacent lane(s) of travel of the machine, and/or boundaries of the driving surface. In some examples, more than one image sensor or other types of sensors (e.g., LiDAR sensor, RADAR sensor, etc.) may be used to incorporate multiple fields of view.

In some examples, the image data may be captured in one format (e.g., RCCB, RCCC, RBGC, etc.) and then converted (e.g., during pre-processing of the image data) to another format. In some examples, the image data may be provided as input to a sensor data pre-processor (not shown) to generate pre-processed image data. Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. In some examples, different formats and/or resolutions may be used for training the machine learning model(s) 104 than for inferencing (e.g., during deployment of the machine learning model(s) 104 in the machine).

The sensor data pre-processor may use image data representative of one or more images (or other data representations) and load the sensor data 124 into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the machine learning model(s) 104.

In some examples, a pre-processing image pipeline may be employed by the sensor data pre-processor to process a raw image(s) acquired by a sensor(s) (e.g., an image sensor(s)) and included in the image data to produce pre-processed image data which may represent an input image(s) to an input layer(s) (e.g., a feature extractor layer(s)) of the machine learning model(s) 104. An example of a suitable pre-processing image pipeline may use a raw RCCB Bayer (e.g., 1-channel) type of image from the sensor and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

The machine learning model(s) 104 may use as input one or more images or other data representations (e.g., LiDAR data, RADAR data, etc.) as represented by the sensor data 124 to generate the output(s) (e.g., the point data 126). In some examples, the machine learning model(s) 104 may take, as input, an image(s) represented by the sensor data 124 (e.g., after pre-processing) to generate the point data 126. Although examples are described herein with respect to using neural networks, and specifically CNNs, as the machine learning model(s) 104, this is not intended to be limiting. For example, and without limitation, the machine learning model(s) 104 described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, large language models, vision language models, multi-modal language models, transformer, diffusion, etc.), and/or other types of machine learning models.

In some examples, the machine learning model(s) 104 may be packaged as a microservice—such an inference microservice (e.g., NVIDIA NIMs)—which may include a container (e.g., an operating system (OS)-level virtualization package) that may include an application programming interface (API) layer, a server layer, a runtime layer, and/or a model "engine." For example, the inference microservice may include the container itself and the model (e.g., weights and biases). In some instances, such as where the machine learning model(s) 104 is small enough (e.g., has a small enough number of parameters), the model may be included within the container itself. In some embodiments, the machine learning model(s) 104 described herein may be deployed as an inference microservice to accelerate deployment of models on any cloud, data center, or edge computing system, while ensuring the data is secure. For example, the inference microservice may include one or more APIs, a pre-configured container for simplified deployment, an optimized inference engine (e.g., built using a standardized AI model deployment an execution software, such as NVIDIA's Triton Inference Server, and/or one or more APIs for high performance deep learning inference, which may include an inference runtime and model optimizations that deliver low latency and high throughput for production applications—such as NVIDIA's TensorRT), and/or enterprise management data for telemetry (e.g., including identity, metrics, health checks, and/or monitoring). The machine learning model(s) described herein may be included as part of the microservice along with an accelerated infrastructure with the ability to deploy with a single command and/or orchestrate and auto-scale with a container orchestration system on accelerated infrastructure (e.g., on a single device up to data center scale). As such, the inference microservice may include the machine learning model(s) (e.g., that has been optimized for high performance inference), an inference runtime software to execute the machine learning model(s) and provide outputs/responses to inputs (e.g., user queries, prompts, etc.), and enterprise management software to provide health checks, identity, and other monitoring. In some embodiments, the inference microservice may include software to perform in-place replacement and/or updating to the machine learning model(s). When replacing or updating, the software that performs the replacement/updating may maintain user configurations of the inference runtime software and enterprise management software.

The point data 126 may represent points (e.g., control or Bezier points) for one or more curves (e.g., Bezier curves) representing geometries associated with the paths. In some examples, the one or more paths may include, but are not limited to, a first path that the machine is to navigate (e.g., an ego path), one or more second paths that are adjacent to the first path (e.g., one or more paths that are to the left of the ego path and/or one or more paths that are to the right of the ego path), and/or one or more other paths, such as an exit path, a merge path, a lane split path, a path of opposing traffic, and/or so forth. Additionally, for a path, the first output may include any number of points such as, but not limited to, two points, five points, eight points, twelve points, twenty points, fifty points, and/or any other number of points for any number of curves (e.g., 1 curve, 2 curves, 3 curves, etc.). As described herein, in some examples, such as to reduce the computing resources needed to generate the path(s) and/or to reduce the latency in generating the path(s), the number of points for a path may be limited by a threshold number of points (e.g., ten points, twelve points, fifteen points, twenty points, etc.) and/or a threshold number of points per distance associated with the path (e.g., twelve points per one hundred meters of path).

The point data 126 may represent locations (e.g., coordinates) associated with the points, where the locations may include one or more various types of locations. For instance, in some examples, the locations associated with the points may include three-dimensional (3D) locations, such as x-coordinate locations, y-coordinate locations, and z-coordinate locations within world space. In such examples, the 3D locations may be relative to a given location, such as the machine 800 and/or the sensor(s) 102 that was used to generate the sensor data 124. Additionally, or alternatively, in some examples, the locations associated with the points may include two-dimensional (2D) locations, such as 2D locations relative to the machine and/or the sensor(s) 102 that was used to generate the sensor data 124. Additionally, or alternatively, in some examples, the locations associated with the points may correspond to locations represented by the sensor representation associated with the sensor data 124. For example, if the sensor data 124 includes image data representing an image, then the locations may include pixel locations associated with the image.

Still, in some examples, the locations associated with the points may include delta values. In such examples, the delta values may represent distances, such as pixel distances, in any direction (e.g., the x-direction, the y-direction, the z-direction, etc.) with respect to an anchor point (e.g., predetermined, fixed anchor points distributed at points in a camera frame, LiDAR frame, etc.), or with respect to anchor points of an anchor line (e.g., a line having one or more anchor points along it). For example, the machine learning model(s) 104 may be trained to predict delta values that correspond to locations (e.g., represented as distances from anchor points) of points associated with an edge or rail (e.g., center path, midline, etc.) of a drivable path. For a given anchor point, the machine learning model(s) 104 may output a series of delta values for one or more points (e.g., each point) associated with a path. Because the pixel coordinates or locations of the anchor points or anchor lines may be known by a path detection system (e.g., the path component 111), the delta values may be used to identify the pixel coordinates or locations corresponding to the points.

Figure 3A:
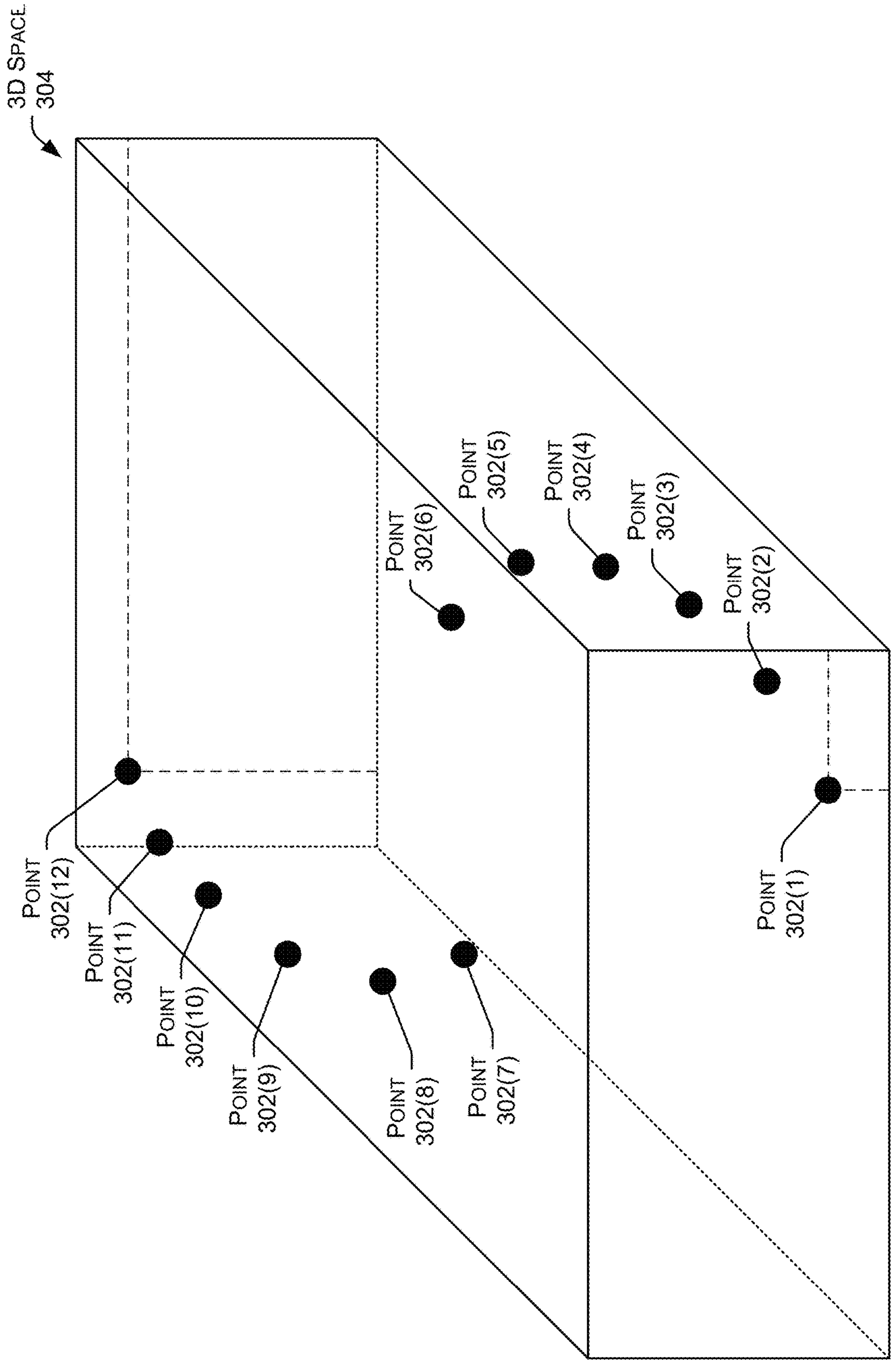
FIG. 3A illustrates an example of control points in a 3D space, in accordance with some embodiments of the present disclosure.

For instance, FIG. 3A illustrates an example of control points 302(1)-302(12) (also referred to collectively as "control points 302") in a 3D space 304, in accordance with some embodiments of the present disclosure. The 3D space 304 may correspond to world space, and the control points 302 may define a curve representative of geometry associated with a path in an environment. For example, and with reference to FIG. 2, the control points 302 may correspond to a Bezier curve representing the geometry associated with the midline 210B of the path 210. As illustrated in the example of FIG. 2, the driving surface curves from right to left and rises within the environment from the perspective or field of view of the image 202. Similarly, the control points 302 curve from right to left and rise within the 3D space 304. For instance, the control point 302(1) may correspond to a point in the environment 204 that is closest to the sensor (e.g., camera) that generated the image 202, and the control point 302(12) may correspond to a further point in the environment 204 along the midline 210B of the path 210 of the driving surface 206 (e.g., nearby or beyond the machine 208 in the example of FIG. 2). In some examples, the locations associated with the control points 302 may be defined using three-dimensional (3D) coordinates, such as x-coordinate locations, y-coordinate locations, and z-coordinate locations. Additionally, while the example of FIG. 3A illustrates the number of control points 302 associated with the path as being equal to 12 control points, in additional or alternative examples, any number of control points 302 may be used, and the number of the control points 302 may be dependent upon a number of factors, such as a visibility distance in the environment, a range of the sensor(s), a complexity of the path, the curvature of the path, etc.

Referring back to the example of FIG. 1, the process 100 may include the Kalman filter(s) 106 using the point data 126 to generate state data 130. For instance, the measurement model(s) 108 of the Kalman filter(s) 106 may use the point data 126 to update or refine the predicted state data 128 determined by the process model(s) 110 of the Kalman filter(s) 106. As described above and herein, multiple curves may be used to represent the geometry of a given path. For instance, the geometry of a left edge of a path may be represented using a first curve, the geometry of a right edge of the path may be represented using a second curve, the geometry of a midline or center path of the lane may be represented using a third curve, etc. Additionally, multiple Kalman filters 106 may be used to maintain different state vectors (e.g., predicted state data 128 and state data 130) for different dimensions of the curves. That is, for an individual curve, the number of Kalman filters 106 and state vectors used to maintain that curve may be equal to, in some examples, the number of dimensions (e.g., 2D, 3D, etc.) associated with the curve and/or the points.

In some examples, multiple (e.g., three) Kalman filters 106 may be used to maintain each curve. For instance, the system(s) may use a first Kalman filter 106 to maintain (e.g., track and predict) first control point dimensions (e.g., x-coordinate values) for a first curve, a second Kalman filter 106 to maintain second control point dimensions (e.g., y-coordinate values) for the first curve, and a third Kalman filter 106 to maintain third control point dimensions (e.g., z-coordinate values) for the first curve. Because of this, in at least one example, a total of 9 Kalman filters 106 may be used to track and predict geometry for a given path/lane. For instance, 3 curves may be used to represent geometry for each path (e.g., left edge curve, right edge curve, and midline curve) and 3 Kalman filters may be used to track and predict the control points for each curve (e.g., one Kalman filter for each 3D coordinate dimension for each curve).

Furthermore, the system(s) may track and predict geometries associated with multiple paths in an environment simultaneously. For instance, the system(s) may use a first set of Kalman filters 106 to track and predict geometry for a first path in the environment, use a second set of Kalman filters 106 to track and predict geometry for a second path in the environment, use a third set of Kalman filters 106 to track and predict geometry for a third path in the environment, and so forth. In such an example, and continuing with the above specifications in which a total of 9 Kalman filters may be used for each path, the system(s) of the present disclosure may use 18 Kalman filters to track and predict 6 Bezier curves for 2 paths, use 27 Kalman filters to track and predict 9 Bezier curves for 3 paths, use 36 Kalman filters to track and predict 12 Bezier curves for 4 paths, and so forth.

The Kalman filter(s) 106 may include at least the process model(s) 110 and the measurement model(s) 108. The process model(s) 110 (also referred to as "prediction models," in some instances) of the Kalman filter(s) 106 may be configured to predict current states (e.g., next states) of the Kalman filter(s) 106 based at least on previous states of the Kalman filter(s) 106 and relative motion of a machine between the previous states and the current states. For instance, the process model(s) 110 may generate or otherwise determine the predicted state data 128 based at least on the state data 130 (from the previous state) and the localization data 132, which may indicate the relative motion of the machine. The measurement model(s) 108 of the Kalman filter(s) 106 may be configured to use various data sources to update or refine the predicted current states of the Kalman filter(s) 106. For instance, the measurement model(s) 108 may use the point data 126 to update or refine the predicted state data 128, and the refined/updated predicted state data 128 may correspond to the state data 130 (of the current state).

As described herein, the process model(s) 110 of the Kalman filter(s) 106 may, in some instances, use an optimized, closed form solution to generate predicted Bezier curve states using relative machine motion. For example, as the machine moves from a previous location to a current location, the process model(s) 110 of the Kalman filter(s) 106 may predict the next states of the Bezier curves based on the previous states and the machine motion. In some instances, the process model(s) 110 may update the tracked states (e.g., previous states) using data indicating a relative motion of the machine between a current timestamp associated with the current states (e.g., state vectors) and a previous timestamp associated with the previous states to generate one or more "transformed previous states." The process model(s) 110 may then, in some instances, compute one or more curve shifting matrices to be used to shift the transformed previous states to the machine's center (e.g., origin), as the state values may still be from the perspective of the previous location.

To compute the curve shifting matrices, the system(s) may, in some examples, determine one or more polyline representations of the curves using the points from the previous states. The polyline points may then be sampled to determine a current location of the machine with respect to the polylines. That is, the system(s) may determine a polyline point of the polyline representation that corresponds to the current location of the machine with respect to the polylines. The system(s) may use the polyline points in front of the current location of the machine to determine one or more new sets of control points to fit new Bezier curves to the polyline representations. In some examples, the new sets of control points may correspond to the curve shifting matrices, or the curve shifting matrices may be determined using these new sets of control points. The process model(s) 110 may then predict the current states of the Kalman filter(s) 106 by, in some examples, multiplying the curve shifting matrices with the transformed previous states.

In various examples, the measurement model(s) 108 of the Kalman filter(s) 106 may obtain the predicted state data 128 from the process model(s) 110 and update or refine the state vectors using, for instance, the point data 126, sensor data representing actual measurements associated with the paths, or any other types of data. For instance, the measurement model(s) 108 may obtain the predicted state data 128 including state vectors having first control point values corresponding to first predicted curves associated with the paths. The measurement model(s) 108 may also obtain the point data 126 from the machine learning model(s) 104 indicating second control point values corresponding to second predicted curves associated with the paths. The measurement model(s) 108 may then fuse, combine, average, etc. the first control point values and the second control point values to update the predicted state data 128 and output the state data 130.

In some examples, the measurement model(s) 108 may weigh one or more values (e.g., point coordinate locations, etc.) in the predicted state data 128 against values in the point data 126 computed by the machine learning model(s) 104. This may allow the Kalman filter(s) 106 to output temporally stable state data 130. In some examples, the measurement model(s) 108 may perform temporal smoothing of the various values using the following equation:

$$\text{final\_value} = a * \text{value}_{predicted} + (1 - a) * \text{value}_{measured} \quad (3)$$

In equation (3), a may be a weighting factor, final_value may be the value of a point after smoothing, $\text{value}_{predicted}$ may be a point value computed for a point of the predicted state data 128, and $\text{value}_{measured}$ may be a value computed for a point by the machine learning model(s) 104. However, this is just an example of how the measurement model(s) 108 may fuse the point data 126 and the predicted state data 128 to generate the state data 130, and in additional or alternative examples, any techniques for combining, updating, or refining the predicted state data 128 based on the point data 126—or vice-versa—may be used.

As further illustrated in the example of FIG. 1, the process 100 may include the path component 111 processing the state data 130 and, based at least on the processing, generating path data 134 representing one or more paths. While the example of FIG. 1 illustrates the path component as being separate from the machine learning model(s) 104, in other examples, the path component 111 may be included as part of the machine learning model(s) 104. For example, the path component 111 may correspond to one or more layers of the machine learning model(s) 104 that are trained to perform one or more of the processes described herein with respect to the path component 111. In such examples, the machine learning model(s) 104 may be configured to output the path data 134 in addition to, or alternatively from, outputting the point data 126.

The path component 111 may be configured to use the control points, included in the state data 130, to generate one or more curves representing one or more geometries associated with the path(s). For example, and for a path, the path component 111 may use one or more algorithms to generate a curve, such as a Bezier curve, based at least on the points associated with the path. As described herein, in some examples, an algorithm may include a Bezier algorithm such as, but not limited to, a two-dimensional Bezier curve fitting algorithm, a three-dimensional Bezier curve fitting algorithm, a cubic Bezier curve fitting algorithm, a higher order Bezier curve fitting algorithm, a split wise Bezier curve fitting algorithm, and/or any other type of Bezier algorithm. Additionally, or alternatively, in some examples, an algorithm may include another type of algorithm that is configured to generate a curve based at least on the points associated with the path. The path component 111 may then use similar processes to generate a respective curve associated with one or more (e.g., each) of the other path(s).

For an example of generating a curve (e.g., or any other representation of geometry) associated with a path, given a set of n+1 points associated with the path, a curve may be generated using the following equation:

$$B(t) = \sum_{i=0}^{n} B_i^n(t) P_i \tag{1}$$

In equation (1), t may be a value between 0 to 1 that determines the position along the curve, $P_i$ may be the i-th point, and $$B_i^n$$

may be Bernstein polynomials of degree n such that:

$$B_i^n(t) = \binom{n}{i} t^i (1-t)^{n-i} \tag{2}$$

Figure 3B:
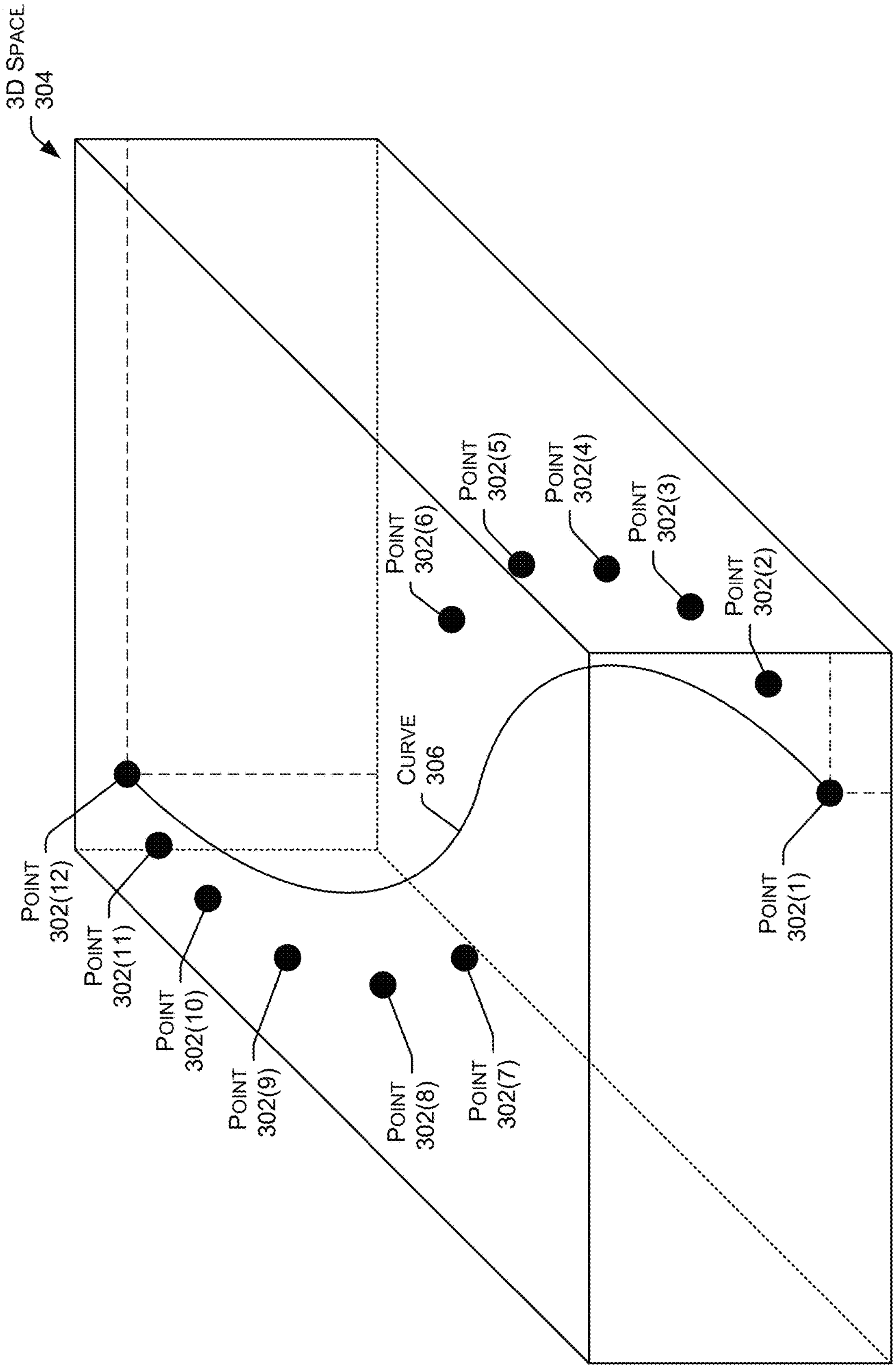
FIG. 3B illustrates an example of a Bezier curve corresponding to the control points in the example of FIG. 3A, in accordance with some embodiments of the present disclosure.

For instance, FIG. 3B illustrates an example of a Bezier curve 306 corresponding to the control points 302 in the example of FIG. 3A, in accordance with some embodiments of the present disclosure. As an example, and with reference to FIG. 2, the curve 306 may be associated with the midline 210B of the path 210 of the driving surface 206. In the example of FIG. 3B, the state data 130 and/or a combination of multiple instances of the state data 130 may indicate the respective locations of the points 302 within the 3D space 304. The path component 111 may then perform one or more of the processes described herein, such as using one or more Bezier algorithms, to determine the curve 306 (e.g., a representation of path geometry, such as a Bezier curve) associated with the path. As shown, by using the Bezier algorithm(s), the curve 306 may start at a first point 302(1), end at a last point 302(12), and include a shape that is based at least on the other points 302(2)-(11). Additionally, by using the Bezier algorithm(s), the curve 306 may include a smooth, continuous curve that is intended to represent the actual path that the machine is to follow within an environment 204. Furthermore, by using the Bezier algorithm(s), the curve 306 may be represented using a smaller number of points 302 than conventional methods, resulting in greater computational efficiency while maintaining—or even improving upon—the accuracy of the geometric representation of the path.

The process 100 may also include a drive stack 112 that uses the path data 134 and/or the determined path(s) in order to cause the machine to perform one or more operations. As shown, the drive stack 112 may include a perception component (e.g., corresponding to a perception layer of the drive stack 112), a model component 114, a planning component 116 (e.g., corresponding to a planning layer of the drive stack 112), a control component 118 (e.g., corresponding to a control layer of the drive stack 112), an avoidance component 120 (e.g., corresponding to an obstacle or collision avoidance layer of the drive stack 112), an actuation component 122 (e.g., corresponding to an actuation layer of the drive stack 112), and/or other components corresponding to additional and/or alternative layers of the drive stack 112. The process 100 may, in some examples, be executed by the perception component(s), which may feed up the layers of the drive stack 112 to the model component 114, as described in more detail herein.

The model component 114 may be used to generate, update, and/or define a world model. The model component 114 may use information generated by and received from the perception component(s) of the drive stack 112 (e.g., the locations of the rails or edges of drivable paths based on the path geometry(ies), the path classification(s), the path data 134, etc.). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The model component 114 may continually update the world model based on newly generated and/or received inputs (e.g., data) from the obstacle perceiver, the path perceiver, the wait perceiver, the map perceiver, and/or other components of the autonomous machine control system.

The world model may be used to help inform the planning component 116, the control component 118, the avoidance component 120, and/or the actuation component 122 of the drive stack 112. The obstacle perceiver may perform obstacle perception that may be based on where the machine is allowed to drive or is capable of driving (e.g., based on the location of the drivable paths defined by the path geometry(ies)), and how fast the machine can drive without colliding with an obstacle (e.g., an object, such as a structure, entity, machine, etc.) that is sensed by the sensors of the machine.

The path perceiver may perform path perception, such as by perceiving nominal paths that are available in a particular situation. In some examples, the path perceiver may further take into account lane changes for path perception. A lane graph may represent the path or paths available to the machine, and may be as simple as a single path on a highway on-ramp. In some examples, the lance graph may include paths to a desired lane and/or may indicate available changes down the highway (or other road type), or may include nearby lanes, lane changes, forks, turns, cloverleaf interchanges, merges, and/or other information. In at least some examples, the path perceiver may correspond to or include the machine learning model(s) 104, the Kalman filter(s) 106, and/or the path component 111.

The wait perceiver may be responsible to determining constraints on the machine as a result of rules, conventions, and/or practical considerations. For example, the rules, conventions, and/or practical considerations may be in relation to traffic lights, multi-way stops, yields, merges, toll booths, gates, police or other emergency personnel, road workers, stopped buses or other machines, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the machine of static or stationary infrastructure objects and obstacles. The map perceiver may also generate information for the wait perceiver and/or the path perceiver, for example, such as to determine which light at an intersection has to be green for the machine to take a particular path.

In some examples, information from the map perceiver may be sent, transmitted, and/or provided to a server(s) (e.g., to a map manager of the server(s)), and information from the server(s) may be sent, transmitted, and/or provided to the map perceiver and/or a localization manager of the machine. The map manager may include a cloud mapping application that is remotely located from the machine and accessible by the machine over one or more network(s). For example, the map perceiver and/or the localization manager of the machine may communicate with the map manager and/or one or more other components or features of the server(s) to inform the map perceiver and/or the localization manager of past and present drives or trips of the machine, as well as past and present drives or trips of other machines. The map manager may provide mapping outputs (e.g., map data) that may be localized by the localization manager based on a particular location of the machine, and the localized mapping outputs may be used by the model component 114 to generate and/or update the world model.

The planning component 116 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the machine, etc. The waypoints may be representative of a specific distance into the future for the machine, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the machine, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component 118 may follow a trajectory or path (lateral and longitudinal) that has been received from the behavior selector (e.g., based on the path geometry(ies) and/or the classification(s)) of the planning component 116 as closely as possible and within the capabilities of the machine. The control component 118 may use tight feedback to handle unplanned events or behaviors that are not modeled and/or anything that causes discrepancies from the ideal (e.g., unexpected delay). In some examples, the control component 118 may use a forward prediction model that takes control as an input variable, and produces predictions that may be compared with the desired state (e.g., compared with the desired lateral and longitudinal path requested by the planning component 116). The control(s) that minimize discrepancy may be determined.

Although the planning component 116 and the control component 118 are illustrated separately, this is not intended to be limiting. For instance, in some example, the delineation between the planning component 116 and the control component 118 may not be precisely defined. As such, at least some of the components, features, and/or functionality attributed to the planning component 116 may be associated with the control component 118, and vice versa. This may also hold true for any of the separately illustrated components of the drive stack 112.

The avoidance component 120 may aid the machine in avoiding collisions with objects (e.g., dynamic and stationary objects). The avoidance component 120 may include a computational mechanism at a "primal level" of obstacle avoidance, and may act as a "survival brain" or "reptile brain" for the machine. In some examples, the avoidance component 120 may be used independently of components, features, and/or functionality of the machine that is required to obey traffic rules and drive courteously. In such examples, the avoidance component 120 may ignore traffic laws, rules of the road, and courteous driving norms in order to ensure that collisions do not occur between the machine and any objects. As such, the obstacle avoidance layer may be a separate layer from the rules of the road layer, and the obstacle avoidance layer may ensure that the machine is only performing safe actions from an obstacle avoidance standpoint. The rules of the road layer, on the other hand, may ensure that machine obeys traffic laws and conventions, and observes lawful and conventional right of way (as described herein).

In some examples, the drivable paths as defined by the path geometries and/or the path data 134 corresponding to each of the path geometries may be used by the avoidance component 120 in determining controls or actions to take. For example, the drivable paths may provide an indication to the avoidance component 120 of where the machine may maneuver without striking any objects, structures, and/or the like, or at least where no static structures may exist. In some examples, the avoidance component 120 may be implemented as a separate, discrete feature of the machine. For example, the avoidance component 120 may operate separately (e.g., in parallel with, prior to, and/or after) the planning layer, the control layer, the actuation layer, and/or other layers of the drive stack 112.

Figure 4:
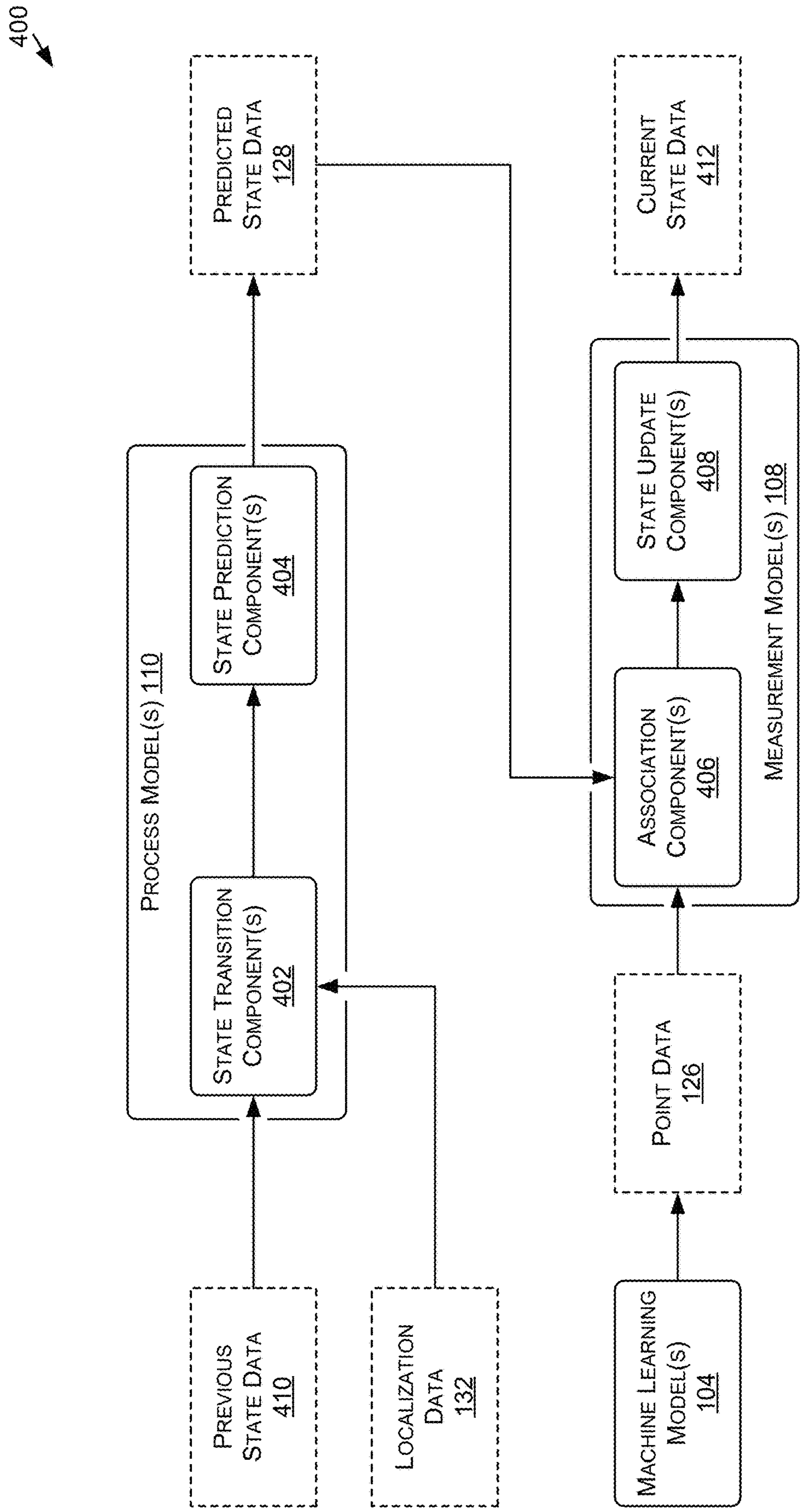
FIG. 4 is a data flow diagram illustrating additional example detail associated with certain operations of the process described in the example of FIG. 1, in accordance with some embodiments of the present disclosure.

Now referring to FIG. 4, FIG. 4 is a data flow diagram illustrating example detail 400 associated with certain operations of the process 100 described in the example of FIG. 1, in accordance with some embodiments of the present disclosure. For instance, the process model(s) 110 of the Kalman filter(s) 106 may include a state transition component(s) 402 and state prediction component(s) 404, and the measurement model(s) 108 of the Kalman filter(s) 106 may include an association component(s) 406 and a state update component(s) 408.

The state transition component(s) 402 of the process model(s) 110 may obtain previous state data 410 and the localization data 132 and determine one or more state transition matrices that represent how the state of the Kalman filter(s) 106 evolve over time. In some instances, state transition component(s) 402 may update the previous state data 410 using the localization data 132, which may indicate a relative motion of the machine between a current timestamp and a previous timestamp associated with the previous state data 410 to generate one or more "transformed previous states." The state transition component(s) 402 may compute one or more curve shifting matrices to be used to shift the transformed previous state data 410 to the machine's center (e.g., origin).

To compute the curve shifting matrices, the state transition component(s) 402 may, in some examples, determine one or more polyline representations of the curves using the points from the previous state data 410. The polyline points may then be sampled to determine a current location of the machine with respect to the polylines. That is, the state transition component(s) 402 may determine a polyline point of the polyline representation that corresponds to the current location of the machine with respect to the polylines. The state transition component(s) 402 may use the polyline points in front of the current location of the machine to determine one or more new sets of control points to fit new Bezier curves to the polyline representations. In some examples, the new sets of control points may correspond to the curve shifting matrices, or the curve shifting matrices may be determined using these new sets of control points. The state prediction component(s) 404 of the process model(s) 110 may then generate the predicted state data 128 by, in some examples, multiplying the curve shifting matrices with the transformed previous state data 410. In this way, the process model(s) 110 of the Kalman filter(s) 106 may use an optimized, closed form solution to generate predicted Bezier curve states using relative machine motion.

In various examples, the measurement model(s) 108 of the Kalman filter(s) 106 may obtain the predicted state data 128 from the process model(s) 110. The association component(s) 406 of the measurement model(s) 108 may associate the predicted state data 128 with the point data 126 obtained from the machine learning model(s) 104. That is, the association component(s) 406 may associate predicted state data 128 for certain paths or curves with the point data 126 for those certain paths or curves. In some examples, the association component(s) 406 may associate the predicted state data 128 for a path with the point data 126 for the path based on the midlines of the paths being tracked/predicted.

For instance, points for a first midline curve may be associated with a first confidence value that the points are associated with a first path, a second confidence value that the points are associated with a second path, a third confidence value that the points are associated with a third path, and so forth. The association component(s) 406 may then determine that the points are associated with the first path when the first confidence value includes a highest confidence value. Additionally, the association component(s) 406 may perform similar processes for each of the other two paths in this example. The association component(s) 406 may then associate the points for the edge curves for the paths with their respective paths based at least on associating the midline curve points with their respective paths. Using these or other techniques, the association component(s) 406 may determine which paths the point data 126 and/or the predicted state data 128 correspond to.

The state update component(s) 408 may then update or refine the predicted state data 128 using the point data 126. The state update component(s) 408 of the measurement model(s) 108 may then output, as the current state data 412, the updated/refined predicted state data 128. For instance, the measurement model(s) 108 may fuse, combine, average, weight, etc. the values of the predicted state data 128 and the values of the point data 126 to generate or otherwise determine the current state data 412. In some examples, the state update component(s) 408 may weigh one or more values (e.g., point coordinate locations, etc.) in the predicted state data 128 against values in the point data 126 computed by the machine learning model(s) 104. This may allow the Kalman filter(s) 106 to output temporally stable geometries. In some examples, the state update component(s) 408 may perform temporal smoothing of the various values using, for instance, equation (3) described above and/or any other smoothing techniques.

Figure 5:
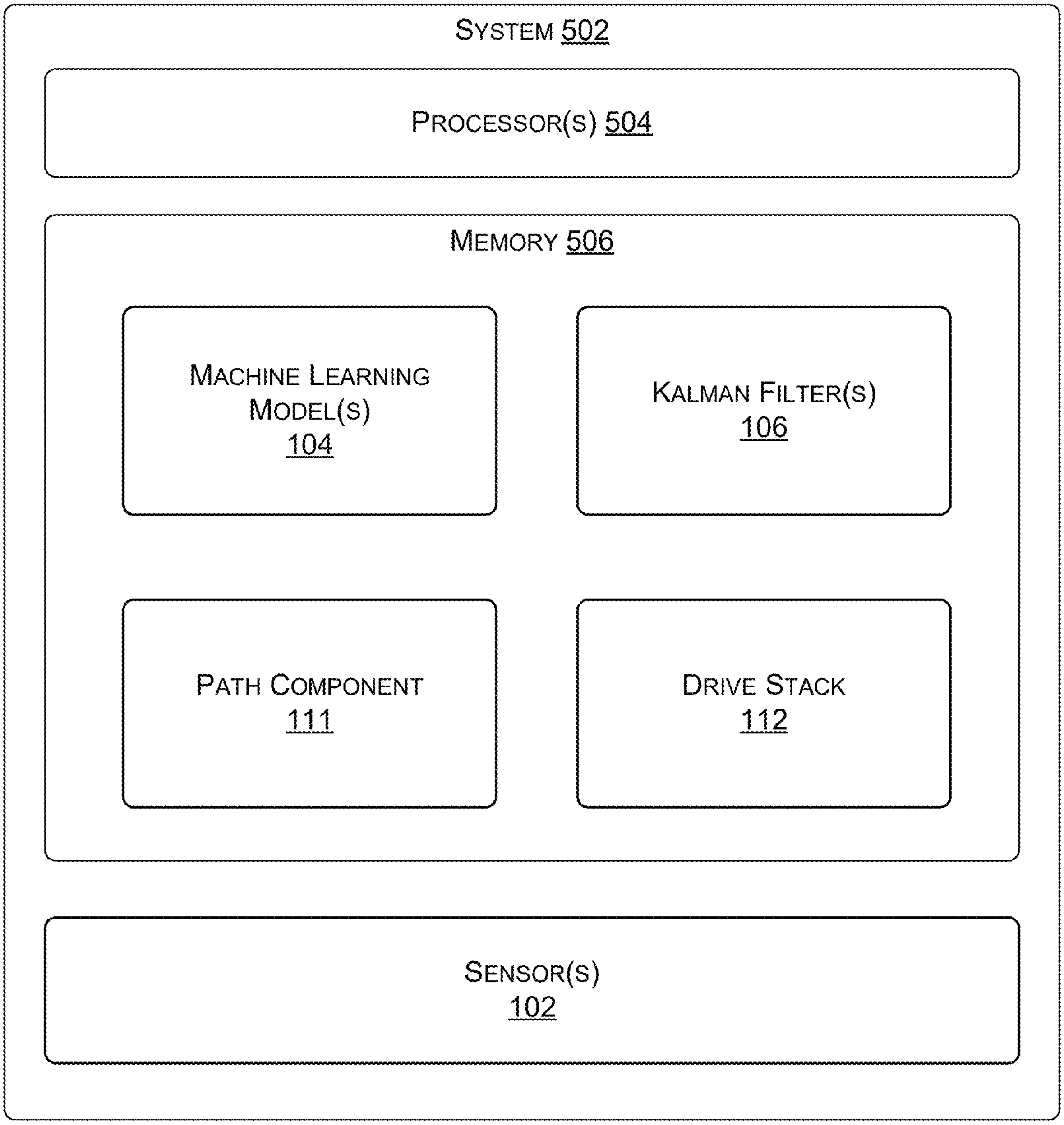
FIG. 5 illustrates an example of a system that may perform one or more of the processes described herein, in accordance with some embodiments of the present disclosure.

FIG. 5 illustrates an example of a system 502 that may perform one or more of the processes described herein, in accordance with some embodiments of the present disclosure. As shown, the system 502 (which may represent, and/or include, the example computing device(s) 900 and/or the example data center 1000) may include one or more processors 504 (which may be similar to, and/or include, the CPUs 906 and/or the GPUs 908), memory 506 (which may be similar to, and/or include, the memory 904), and the sensor(s) 102. For instance, the memory 506 may store the machine learning model(s) 104, the Kalman filter(s) 106, the path component 111, and the drive stack 112. Additionally, the processor(s) 504 may execute the machine learning model(s) 104, the Kalman filter(s) 106, the path component 111, and/or the drive stack 112 to perform one or more of the processes described herein.

For instance, the system 502 may use the Kalman filter(s) 106 and/or other recursive models to track and predict control points corresponding to Bezier curves (e.g., 2D and/or 3D Bezier curves), which may be representative of geometries associated with one or more lanes of a driving surface. In some instances, the system 502 may use multiple Bezier curves to represent the geometry of a lane, and may also use multiple Kalman filters 106 to track and predict control points for each Bezier curve. For example, the system 502 may represent an edge or a midline of the lane using a first Bezier curve, and control point coordinates for the first Bezier curve may be tracked and predicted using multiple Kalman filters 106, as described herein.

Figure 6:
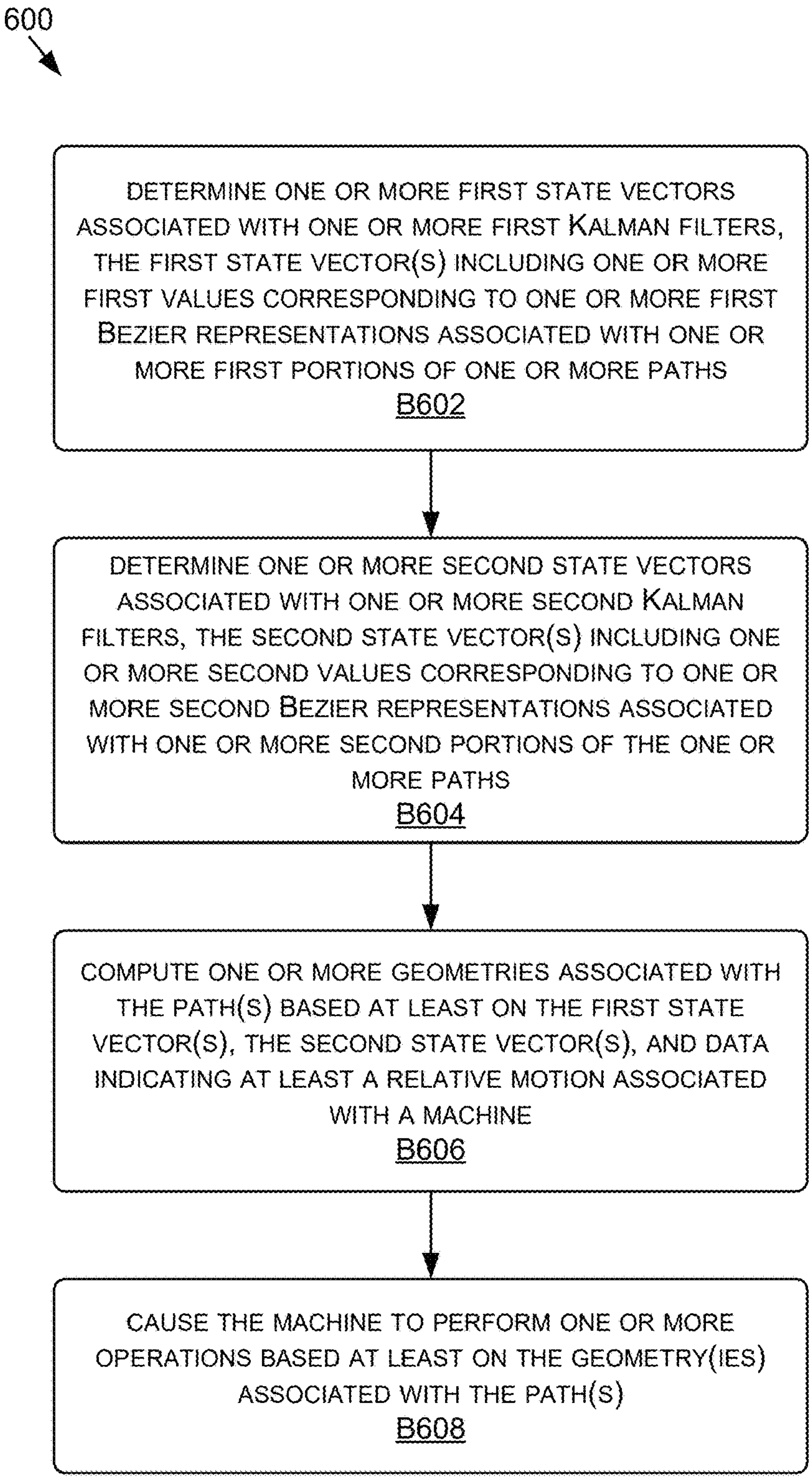
FIG. 6 is a flow diagram illustrating an example of a method for tracking multi-dimensional path geometry using Kalman filters, in accordance with some embodiments of the present disclosure.
Figure 7:
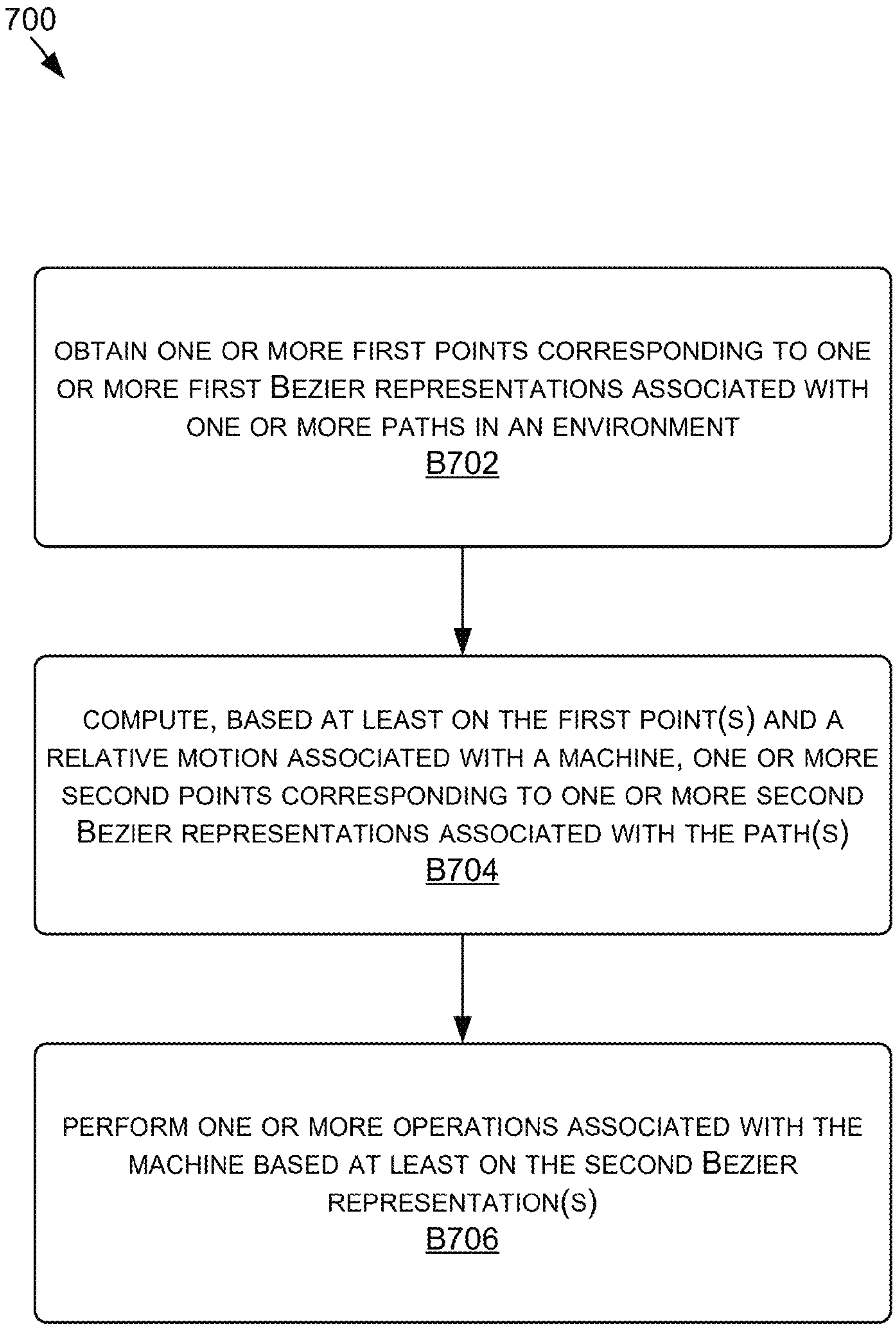
FIG. 7 is a flow diagram illustrating an example of a method for using recursive models to predict multi-dimensional path geometry, in accordance with some embodiments of the present disclosure.

Now referring to FIGS. 6 and 7, each block of methods 600 and 700, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, the methods 600 and 700 are described, by way of example, with respect to FIG. 1. However, these methods may additionally or alternatively be executed by any one system, or any combination of systems, including, but not limited to, those described herein.

FIG. 6 is a flow diagram illustrating an example of a method 600 for tracking multi-dimensional path geometry using Kalman filters, in accordance with some embodiments of the present disclosure. The method 600, at block B602, may include determining one or more first state vectors associated with one or more first Kalman filters, the first state vector(s) including one or more first values corresponding to one or more first Bezier representations associated with one or more first portions of one or more paths. For instance, the process model(s) 110 may determine the predicted state data 128, which may include the first state vector(s). The first state vector(s) may include the first value(s) corresponding to the first Bezier representation(s) associated with the first portion(s) of the path(s).

The method 600, at block B604, may include determining one or more second state vectors associated with one or more second Kalman filters, the second state vector(s) including one or more second values corresponding to one or more second Bezier representations associated with one or more second portions of the one or more paths. For instance, the process model(s) 110 may determine a second instances of the predicted state data 128, which may include the second state vector(s). The second state vector(s) may include the second value(s) corresponding to the second Bezier representation(s) associated with the second portion (s) of the path(s). In some examples, the second value(s) may be the same or different than the first value(s), the second Bezier representation(s) may be the same or different than the first Bezier representation(s), and/or the second portion(s) may be the same or different than the first portion (s).

The method 600, at block B606, may include computing one or more geometries associated with the path(s) based at least on the first state vector(s), the second state vector(s), and data indicating at least a relative motion associated with a machine. For instance, the path component 111 may compute the geometry(ies) associated with the path(s). In some examples, the process model(s) 110 may output the predicted state data 128 based at least on the first state vector(s), the second state vector(s), and the relative motion associated with the machine, then the measurement model(s) 108 may use the point data 126 and/or other machine learning model or perception outputs to refine or update the predicted state data 128 and generate the state data 130, and the path component 111 may use the state data 130 to generate path data 134 representing the geometry(ies) associated with the paths.

The method 600, at block B608, may include causing the machine to perform one or more operations based at least on the geometry(ies) associated with the path(s). For instance, one or more components of the drive stack 112 may cause the machine to perform one or more operations based at least on the geometry(ies) associated with the path(s). For instance, the planning component 116 may plan a trajectory for the machine to follow using the path data 134, or the avoidance component 120 may use the path data 134 to cause the machine to select a path that avoids one or more objects, etc.

FIG. 7 is a flow diagram illustrating an example of a method 700 for using recursive models to predict multi-dimensional path geometry, in accordance with some embodiments of the present disclosure. The method 700, at block B702, may include obtaining one or more first points corresponding to one or more first Bezier representations associated with one or more paths in an environment. For instance, the process model(s) 110 may obtain the state data 130 including the first point(s) corresponding to the first Bezier representation(s) associated with the path(s) in the environment. In some examples, the first point(s) may correspond to control point coordinate dimensions (e.g., x-coordinate values, y-coordinate values, or z-coordinate values) of the first Bezier representation(s).

The method 700, at block B704, may include computing, based at least on the first point(s) and a relative motion associated with a machine, one or more second points corresponding to one or more second Bezier representations associated with the path(s). For instance, the process model (s) 110 may compute the predicted state data 128 including the second point(s) based at least on the state data 130 and the localization data 132, which may indicate the relative motion associated with the machine. The second point(s) of the predicted state data 128 may correspond to the second Bezier representation(s) associated with the path(s). In some examples, the second point(s) may correspond to control point coordinate dimensions (e.g., x-coordinate values, y-coordinate values, or z-coordinate values) of the second Bezier representation(s).

The method 700, at block B706, may include performing one or more operations associated with the machine based at least on the one or more second Bezier representations. For instance, the drive stack 112 may perform the operation(s) associated with the machine 800 based at least on the path data 134 indicating the second Bezier representation(s). In some examples, the measurement model(s) 108 may update the second Bezier representation(s) to generate the state data 130, and the path component 111 may determine the path data 134 using the state data 130. In some examples, the planning component 116 of the drive stack 112 may plan a trajectory for the machine to follow using the path data 134, or the avoidance component 120 may use the path data 134 to cause the machine to select a path that avoids one or more objects, etc.

Example Autonomous Vehicle

Figure 8A:
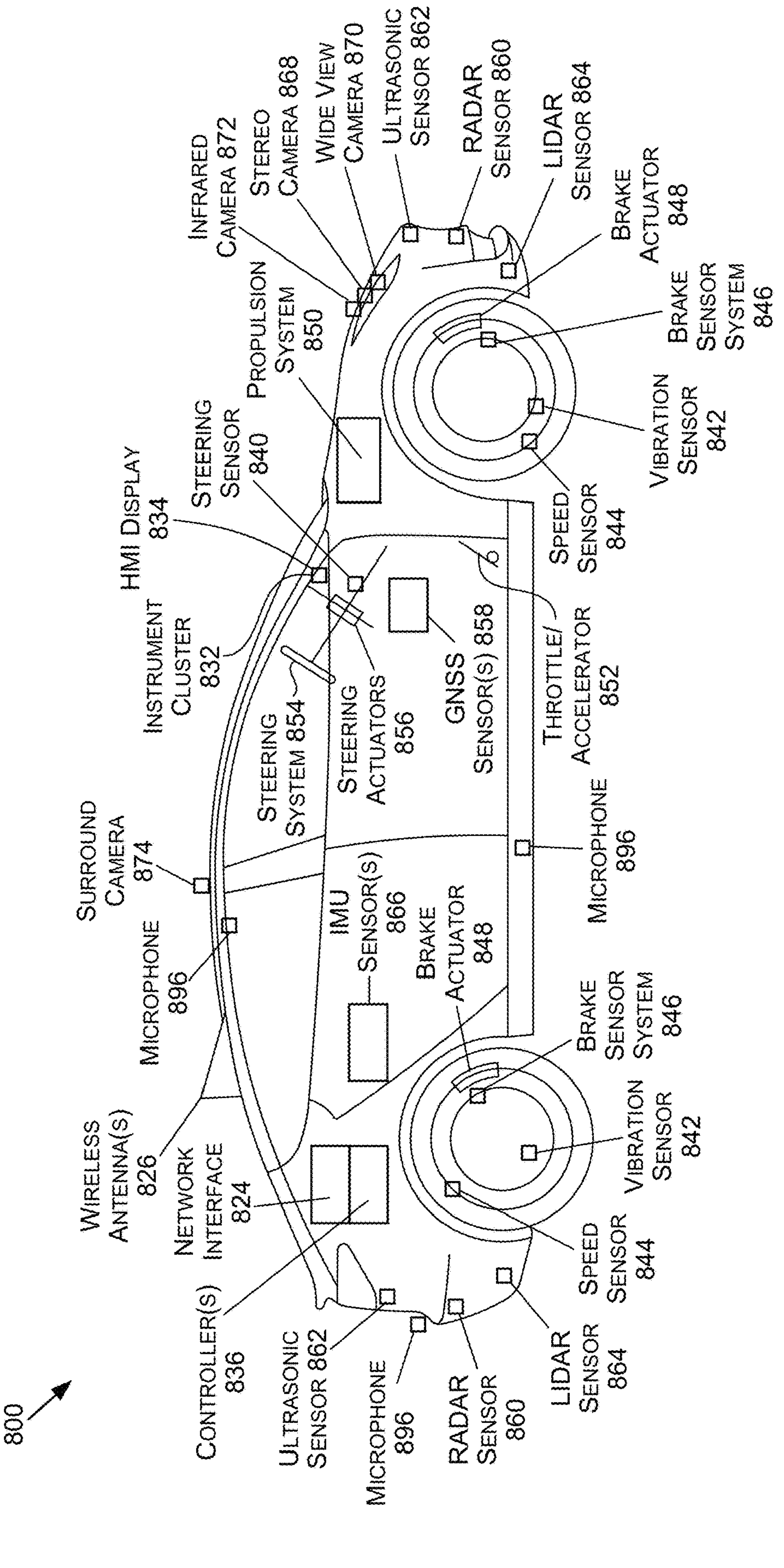
FIG. 8A is an illustration of an example autonomous vehicle, in accordance with some embodiments of the present disclosure.

FIG. 8A is an illustration of an example autonomous vehicle 800, in accordance with some embodiments of the present disclosure. The autonomous vehicle 800 (alternatively referred to herein as the "vehicle 800") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 800 may be capable of functionality in accordance with one or more of Level 3-Level 5 of the autonomous driving levels. The vehicle 800 may be capable of functionality in accordance with one or more of Level 1-Level 5 of the autonomous driving levels. For example, the vehicle 800 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 800 or other machine, such as being fully autonomous, being highly autonomous, being conditionally autonomous, being partially autonomous, providing assistive autonomy, being semi-autonomous, being primarily autonomous, or other designation.

The vehicle 800 may include components such as a chassis, a vehicle body, wheels (e.g., 2, 4, 6, 8, 18, etc.), tires, axles, and other components of a vehicle. The vehicle 800 may include a propulsion system 850, such as an internal combustion engine, hybrid electric power plant, an all-electric engine, and/or another propulsion system type. The propulsion system 850 may be connected to a drive train of the vehicle 800, which may include a transmission, to enable the propulsion of the vehicle 800. The propulsion system 850 may be controlled in response to receiving signals from the throttle/accelerator 852.

A steering system 854, which may include a steering wheel, may be used to steer the vehicle 800 (e.g., along a desired path or route) when the propulsion system 850 is operating (e.g., when the vehicle is in motion). The steering system 854 may receive signals from a steering actuator 856. The steering wheel may be optional for full automation (Level 5) functionality.

The brake sensor system 846 may be used to operate the vehicle brakes in response to receiving signals from the brake actuators 848 and/or brake sensors.

Controller(s) 836, which may include one or more system on chips (SoCs) 804 (FIG. 8C) and/or GPU(s), may provide signals (e.g., representative of commands) to one or more components and/or systems of the vehicle 800. For example, the controller(s) may send signals to operate the vehicle brakes via one or more brake actuators 848, to operate the steering system 854 via one or more steering actuators 856, to operate the propulsion system 850 via one or more throttle/accelerators 852. The controller(s) 836 may include one or more onboard (e.g., integrated) computing devices (e.g., supercomputers) that process sensor signals, and output operation commands (e.g., signals representing commands) to enable autonomous driving and/or to assist a human driver in driving the vehicle 800. The controller(s) 836 may include a first controller 836 for autonomous driving functions, a second controller 836 for functional safety functions, a third controller 836 for artificial intelligence functionality (e.g., computer vision), a fourth controller 836 for infotainment functionality, a fifth controller 836 for redundancy in emergency conditions, and/or other controllers. In some examples, a single controller 836 may handle two or more of the above functionalities, two or more controllers 836 may handle a single functionality, and/or any combination thereof.

The controller(s) 836 may provide the signals for controlling one or more components and/or systems of the vehicle 800 in response to sensor data received from one or more sensors (e.g., sensor inputs). The sensor data may be received from, for example and without limitation, global navigation satellite systems ("GNSS") sensor(s) 858 (e.g., Global Positioning System sensor(s)), RADAR sensor(s) 860, ultrasonic sensor(s) 862, LIDAR sensor(s) 864, inertial measurement unit (IMU) sensor(s) 866 (e.g., accelerometer(s), gyroscope(s), magnetic compass(es), magnetometer(s), etc.), microphone(s) 896, stereo camera(s) 868, wide-view camera(s) 870 (e.g., fisheye cameras), infrared camera(s) 872, surround camera(s) 874 (e.g., 360 degree cameras), long-range and/or mid-range camera(s) 898, speed sensor(s) 844 (e.g., for measuring the speed of the vehicle 800), vibration sensor(s) 842, steering sensor(s) 840, brake sensor(s) (e.g., as part of the brake sensor system 846), and/or other sensor types.

One or more of the controller(s) 836 may receive inputs (e.g., represented by input data) from an instrument cluster 832 of the vehicle 800 and provide outputs (e.g., represented by output data, display data, etc.) via a human-machine interface (HMI) display 834, an audible annunciator, a loudspeaker, and/or via other components of the vehicle 800. The outputs may include information such as vehicle velocity, speed, time, map data (e.g., the High Definition ("HD") map 822 of FIG. 8C), location data (e.g., the vehicle's 800 location, such as on a map), direction, location of other vehicles (e.g., an occupancy grid), information about objects and status of objects as perceived by the controller(s) 836, etc. For example, the HMI display 834 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 800 further includes a network interface 824 which may use one or more wireless antenna(s) 826 and/or modem(s) to communicate over one or more networks. For example, the network interface 824 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 826 may also enable communication between objects in the environment (e.g., vehicles, mobile devices, etc.), using local area network(s), such as Bluetooth, Bluetooth Low Energy ("LE"), Z-Wave, ZigBcc, etc., and/or low power wide-area network(s) ("LPWANs"), such as LoRaWAN, SigFox, etc.

Figure 8B:
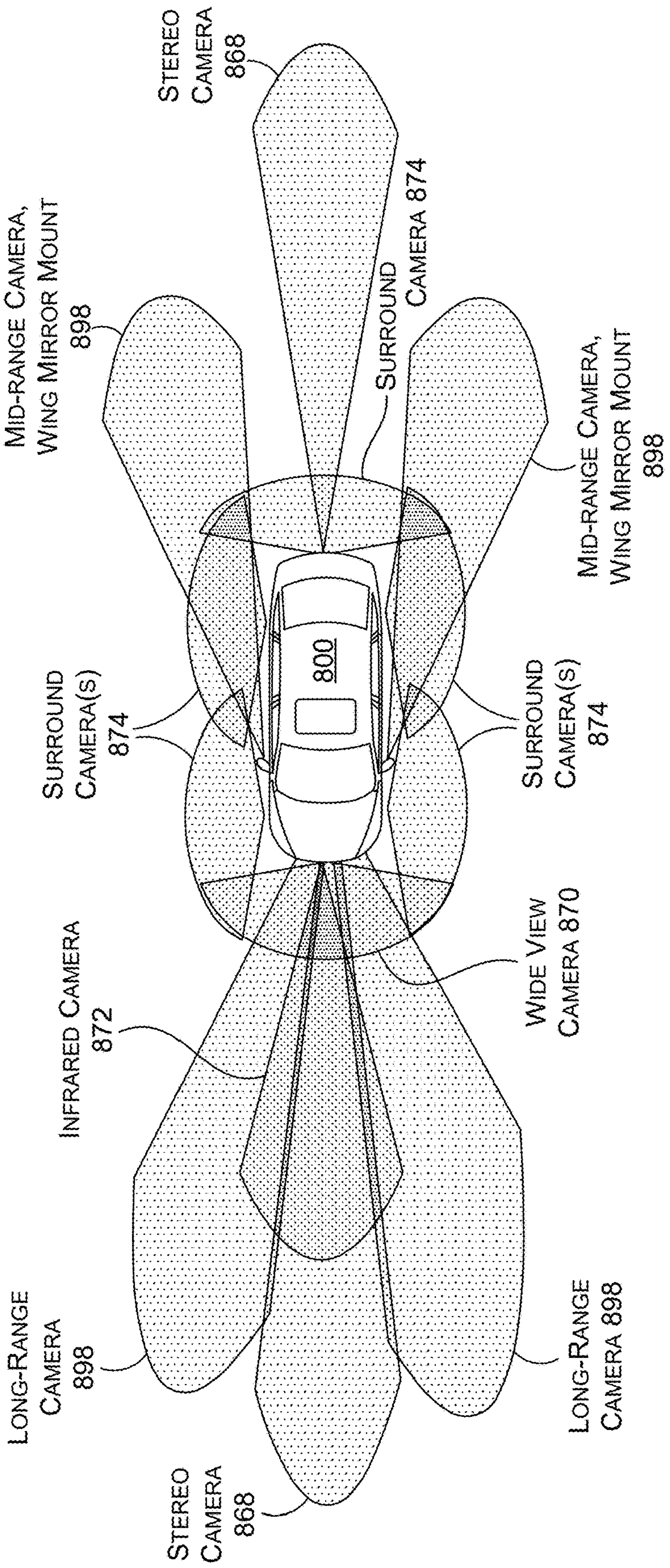
FIG. 8B is an example of camera locations and fields of view for the example autonomous vehicle of FIG. 8A, in accordance with some embodiments of the present disclosure.

FIG. 8B is an example of camera locations and fields of view for the example autonomous vehicle 800 of FIG. 8A, in accordance with some embodiments of the present disclosure. The cameras and respective fields of view are one example embodiment and are not intended to be limiting. For example, additional and/or alternative cameras may be included and/or the cameras may be located at different locations on the vehicle 800.

The camera types for the cameras may include, but are not limited to, digital cameras that may be adapted for use with the components and/or systems of the vehicle 800. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 800 (e.g., front-facing cameras) may be used for surround view, to help identify forward facing paths and obstacles, as well aid in, with the help of one or more controllers 836 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 870 that may be used to perceive objects coming into view from the periphery (e.g., pedestrians, crossing traffic or bicycles). Although only one wide-view camera is illustrated in FIG. 8B, there may be any number (including zero) of wide-view cameras 870 on the vehicle 800. In addition, any number of long-range camera(s) 898 (e.g., a long-view stereo camera pair) may be used for depth-based object detection, especially for objects for which a neural network has not yet been trained. The long-range camera(s) 898 may also be used for object detection and classification, as well as basic object tracking.

Any number of stereo cameras 868 may also be included in a front-facing configuration. In at least one embodiment, one or more of stereo camera(s) 868 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 868 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 868 may be used in addition to, or alternatively from, those described herein.

Cameras with a field of view that include portions of the environment to the side of the vehicle 800 (e.g., side-view cameras) may be used for surround view, providing information used to create and update the occupancy grid, as well as to generate side impact collision warnings. For example, surround camera(s) 874 (e.g., four surround cameras 874 as illustrated in FIG. 8B) may be positioned to on the vehicle 800. The surround camera(s) 874 may include wide-view camera(s) 870, fisheye camera(s), 360 degree camera(s), and/or the like. Four example, four fisheye cameras may be positioned on the vehicle's front, rear, and sides. In an alternative arrangement, the vehicle may use three surround camera(s) 874 (e.g., left, right, and rear), and may leverage one or more other camera(s) (e.g., a forward-facing camera) as a fourth surround view camera.

Cameras with a field of view that include portions of the environment to the rear of the vehicle 800 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 898, stereo camera(s) 868), infrared camera(s) 872, etc.), as described herein.

Figure 8C:
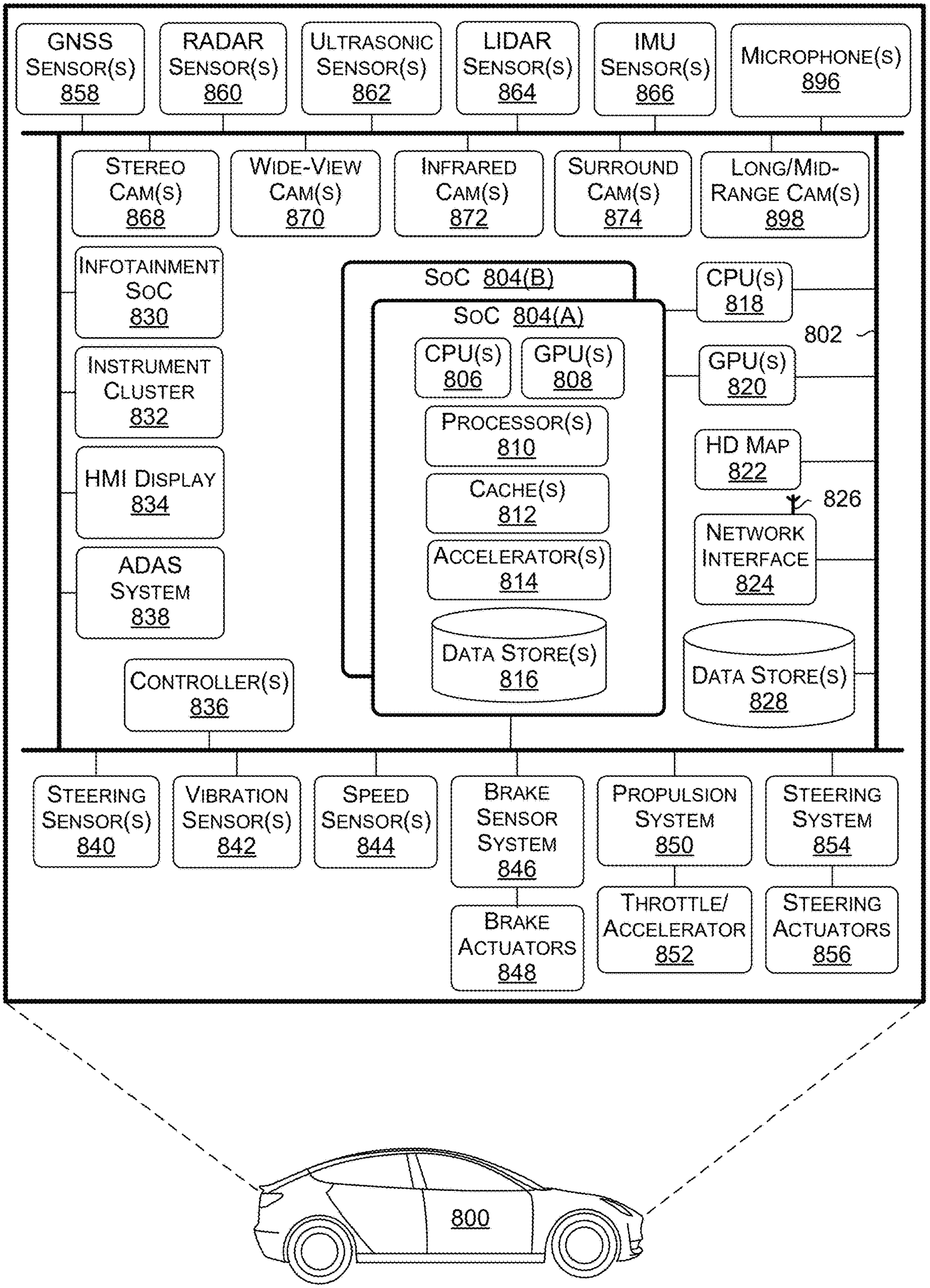
FIG. 8C is a block diagram of an example system architecture for the example autonomous vehicle of FIG. 8A, in accordance with some embodiments of the present disclosure.

FIG. 8C is a block diagram of an example system architecture for the example autonomous vehicle 800 of FIG. 8A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 800 in FIG. 8C are illustrated as being connected via bus 802. The bus 802 may include a Controller Area Network (CAN) data interface (alternatively referred to herein as a "CAN bus"). A CAN may be a network inside the vehicle 800 used to aid in control of various features and functionality of the vehicle 800, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 802 is described herein as being a CAN bus, this is not intended to be limiting. For example, in addition to, or alternatively from, the CAN bus, FlexRay and/or Ethernet may be used. Additionally, although a single line is used to represent the bus 802, this is not intended to be limiting. For example, there may be any number of busses 802, which may include one or more CAN busses, one or more FlexRay busses, one or more Ethernet busses, and/or one or more other types of busses using a different protocol. In some examples, two or more busses 802 may be used to perform different functions, and/or may be used for redundancy. For example, a first bus 802 may be used for collision avoidance functionality and a second bus 802 may be used for actuation control. In any example, each bus 802 may communicate with any of the components of the vehicle 800, and two or more busses 802 may communicate with the same components. In some examples, each SoC 804, each controller 836, and/or each computer within the vehicle may have access to the same input data (e.g., inputs from sensors of the vehicle 800), and may be connected to a common bus, such the CAN bus.

The vehicle 800 may include one or more controller(s) 836, such as those described herein with respect to FIG. 8A. The controller(s) 836 may be used for a variety of functions. The controller(s) 836 may be coupled to any of the various other components and systems of the vehicle 800, and may be used for control of the vehicle 800, artificial intelligence of the vehicle 800, infotainment for the vehicle 800, and/or the like.

The vehicle 800 may include a system(s) on a chip (SoC) 804. The SoC 804 may include CPU(s) 806, GPU(s) 808, processor(s) 810, cache(s) 812, accelerator(s) 814, data store(s) 816, and/or other components and features not illustrated. The SoC(s) 804 may be used to control the vehicle 800 in a variety of platforms and systems. For example, the SoC(s) 804 may be combined in a system (e.g., the system of the vehicle 800) with an HD map 822 which may obtain map refreshes and/or updates via a network interface 824 from one or more servers (e.g., server(s) 878 of FIG. 8D).

The CPU(s) 806 may include a CPU cluster or CPU complex (alternatively referred to herein as a "CCPLEX"). The CPU(s) 806 may include multiple cores and/or L2 caches. For example, in some embodiments, the CPU(s) 806 may include eight cores in a coherent multi-processor configuration. In some embodiments, the CPU(s) 806 may include four dual-core clusters where each cluster has a dedicated L2 cache (e.g., a 2 MB L2 cache). The CPU(s) 806 (e.g., the CCPLEX) may be configured to support simultaneous cluster operation enabling any combination of the clusters of the CPU(s) 806 to be active at any given time.

The CPU(s) 806 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 806 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 808 may include an integrated GPU (alternatively referred to herein as an "iGPU"). The GPU(s) 808 may be programmable and may be efficient for parallel workloads. The GPU(s) 808, in some examples, may use an enhanced tensor instruction set. The GPU(s) 808 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 808 may include at least eight streaming microprocessors. The GPU(s) 808 may use compute application programming interface(s) (API(s)). In addition, the GPU(s) 808 may use one or more parallel computing platforms and/or programming models (e.g., NVIDIA's CUDA).

The GPU(s) 808 may be power-optimized for best performance in automotive and embedded use cases. For example, the GPU(s) 808 may be fabricated on a Fin field-effect transistor (FinFET). However, this is not intended to be limiting and the GPU(s) 808 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 808 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 808 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 808 to access the CPU(s) 806 page tables directly. In such examples, when the GPU(s) 808 memory management unit (MMU) experiences a miss, an address translation request may be transmitted to the CPU(s) 806. In response, the CPU(s) 806 may look in its page tables for the virtual-to-physical mapping for the address and transmits the translation back to the GPU(s) 808. As such, unified memory technology may allow a single unified virtual address space for memory of both the CPU(s) 806 and the GPU(s) 808, thereby simplifying the GPU(s) 808 programming and porting of applications to the GPU(s) 808.

In addition, the GPU(s) 808 may include an access counter that may keep track of the frequency of access of the GPU(s) 808 to memory of other processors. The access counter may help ensure that memory pages are moved to the physical memory of the processor that is accessing the pages most frequently.

The SoC(s) 804 may include any number of cache(s) 812, including those described herein. For example, the cache(s) 812 may include an L3 cache that is available to both the CPU(s) 806 and the GPU(s) 808 (e.g., that is connected both the CPU(s) 806 and the GPU(s) 808). The cache(s) 812 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 804 may include an arithmetic logic unit(s) (ALU(s)) which may be leveraged in performing processing with respect to any of the variety of tasks or operations of the vehicle 800—such as processing DNNs. In addition, the SoC(s) 804 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 806 and/or GPU(s) 808.

The SoC(s) 804 may include one or more accelerators 814 (e.g., hardware accelerators, software accelerators, or a combination thereof). For example, the SoC(s) 804 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 808 and to off-load some of the tasks of the GPU(s) 808 (e.g., to free up more cycles of the GPU(s) 808 for performing other tasks). As an example, the accelerator(s) 814 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 814 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 808, and by using an inference accelerator, for example, a designer may target either the DLA(s) or the GPU(s) 808 for any function. For example, the designer may focus processing of CNNs and floating point operations on the DLA(s) and leave other functions to the GPU(s) 808 and/or other accelerator(s) 814.

The accelerator(s) 814 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 806. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 814 (e.g., the hardware acceleration cluster) may include a computer vision network on-chip and SRAM, for providing a high-bandwidth, low latency SRAM for the accelerator(s) 814. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 804 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 814 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 866 output that correlates with the vehicle 800 orientation, distance, 3D location estimates of the object obtained from the neural network and/or other sensors (e.g., LIDAR sensor(s) 864 or RADAR sensor(s) 860), among others.

The SoC(s) 804 may include data store(s) 816 (e.g., memory). The data store(s) 816 may be on-chip memory of the SoC(s) 804, which may store neural networks to be executed on the GPU and/or the DLA. In some examples, the data store(s) 816 may be large enough in capacity to store multiple instances of neural networks for redundancy and safety. The data store(s) 812 may comprise L2 or L3 cache(s) 812. Reference to the data store(s) 816 may include reference to the memory associated with the PVA, DLA, and/or other accelerator(s) 814, as described herein.

The SoC(s) 804 may include one or more processor(s) 810 (e.g., embedded processors). The processor(s) 810 may include a boot and power management processor that may be a dedicated processor and subsystem to handle boot power and management functions and related security enforcement. The boot and power management processor may be a part of the SoC(s) 804 boot sequence and may provide runtime power management services. The boot power and management processor may provide clock and voltage programming, assistance in system low power state transitions, management of SoC(s) 804 thermals and temperature sensors, and/or management of the SoC(s) 804 power states. Each temperature sensor may be implemented as a ring-oscillator whose output frequency is proportional to temperature, and the SoC(s) 804 may use the ring-oscillators to detect temperatures of the CPU(s) 806, GPU(s) 808, and/or accelerator(s) 814. If temperatures are determined to exceed a threshold, the boot and power management processor may enter a temperature fault routine and put the SoC(s) 804 into a lower power state and/or put the vehicle 800 into a chauffeur to safe stop mode (e.g., bring the vehicle 800 to a safe stop).

The processor(s) 810 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 810 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 810 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 810 may further include a real-time camera engine that may include a dedicated processor subsystem for handling real-time camera management.

The processor(s) 810 may further include a high-dynamic range signal processor that may include an image signal processor that is a hardware engine that is part of the camera processing pipeline.

The processor(s) 810 may include a video image compositor that may be a processing block (e.g., implemented on a microprocessor) that implements video post-processing functions needed by a video playback application to produce the final image for the player window. The video image compositor may perform lens distortion correction on wide-view camera(s) 870, surround camera(s) 874, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 808 is not required to continuously render new surfaces. Even when the GPU(s) 808 is powered on and active doing 3D rendering, the video image compositor may be used to offload the GPU(s) 808 to improve performance and responsiveness.

The SoC(s) 804 may further include a mobile industry processor interface (MIPI) camera serial interface for receiving video and input from cameras, a high-speed interface, and/or a video input block that may be used for camera and related pixel input functions. The SoC(s) 804 may further include an input/output controller(s) that may be controlled by software and may be used for receiving I/O signals that are uncommitted to a specific role.

The SoC(s) 804 may further include a broad range of peripheral interfaces to enable communication with peripherals, audio codecs, power management, and/or other devices. The SoC(s) 804 may be used to process data from cameras (e.g., connected over Gigabit Multimedia Serial Link and Ethernet), sensors (e.g., LIDAR sensor(s) 864, RADAR sensor(s) 860, etc. that may be connected over Ethernet), data from bus 802 (e.g., speed of vehicle 800, steering wheel position, etc.), data from GNSS sensor(s) 858 (e.g., connected over Ethernet or CAN bus). The SoC(s) 804 may further include dedicated high-performance mass storage controllers that may include their own DMA engines, and that may be used to free the CPU(s) 806 from routine data management tasks.

The SoC(s) 804 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 804 may be faster, more reliable, and even more energy-efficient and space-efficient than conventional systems. For example, the accelerator(s) 814, when combined with the CPU(s) 806, the GPU(s) 808, and the data store(s) 816, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 820) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 808.

In some examples, a CNN for facial recognition and vehicle owner identification may use data from camera sensors to identify the presence of an authorized driver and/or owner of the vehicle 800. The always on sensor processing engine may be used to unlock the vehicle when the owner approaches the driver door and turn on the lights, and, in security mode, to disable the vehicle when the owner leaves the vehicle. In this way, the SoC(s) 804 provide for security against theft and/or carjacking.

In another example, a CNN for emergency vehicle detection and identification may use data from microphones 896 to detect and identify emergency vehicle sirens. In contrast to conventional systems, that use general classifiers to detect sirens and manually extract features, the SoC(s) 804 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 858. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 862, until the emergency vehicle(s) passes.

The vehicle may include a CPU(s) 818 (e.g., discrete CPU(s), or dCPU(s)), that may be coupled to the SoC(s) 804 via a high-speed interconnect (e.g., PCIe). The CPU(s) 818 may include an X86 processor, for example. The CPU(s) 818 may be used to perform any of a variety of functions, including arbitrating potentially inconsistent results between ADAS sensors and the SoC(s) 804, and/or monitoring the status and health of the controller(s) 836 and/or infotainment SoC 830, for example.

The vehicle 800 may include a GPU(s) 820 (e.g., discrete GPU(s), or dGPU(s)), that may be coupled to the SoC(s) 804 via a high-speed interconnect (e.g., NVIDIA's NVLINK). The GPU(s) 820 may provide additional artificial intelligence functionality, such as by executing redundant and/or different neural networks, and may be used to train and/or update neural networks based on input (e.g., sensor data) from sensors of the vehicle 800.

The vehicle 800 may further include the network interface 824 which may include one or more wireless antennas 826 (e.g., one or more wireless antennas for different communication protocols, such as a cellular antenna, a Bluetooth antenna, etc.). The network interface 824 may be used to enable wireless connectivity over the Internet with the cloud (e.g., with the server(s) 878 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 800 information about vehicles in proximity to the vehicle 800 (e.g., vehicles in front of, on the side of, and/or behind the vehicle 800). This functionality may be part of a cooperative adaptive cruise control functionality of the vehicle 800.

The network interface 824 may include a SoC that provides modulation and demodulation functionality and enables the controller(s) 836 to communicate over wireless networks. The network interface 824 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 800 may further include data store(s) 828 which may include off-chip (e.g., off the SoC(s) 804) storage. The data store(s) 828 may include one or more storage elements including RAM, SRAM, DRAM, VRAM, Flash, hard disks, and/or other components and/or devices that may store at least one bit of data.

The vehicle 800 may further include GNSS sensor(s) 858. The GNSS sensor(s) 858 (e.g., GPS, assisted GPS sensors, differential GPS (DGPS) sensors, etc.), to assist in mapping, perception, occupancy grid generation, and/or path planning functions. Any number of GNSS sensor(s) 858 may be used, including, for example and without limitation, a GPS using a USB connector with an Ethernet to Serial (RS-232) bridge.

The vehicle 800 may further include RADAR sensor(s) 860. The RADAR sensor(s) 860 may be used by the vehicle 800 for long-range vehicle detection, even in darkness and/or severe weather conditions. RADAR functional safety levels may be ASIL B. The RADAR sensor(s) 860 may use the CAN and/or the bus 802 (e.g., to transmit data generated by the RADAR sensor(s) 860) for control and to access object tracking data, with access to Ethernet to access raw data in some examples. A wide variety of RADAR sensor types may be used. For example, and without limitation, the RADAR sensor(s) 860 may be suitable for front, rear, and side RADAR use. In some example, Pulse Doppler RADAR sensor(s) are used.

The RADAR sensor(s) 860 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 860 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 800 surroundings at higher speeds with minimal interference from traffic in adjacent lanes. The other two antennae may expand the field of view, making it possible to quickly detect vehicles entering or leaving the vehicle's 800 lane.

Mid-range RADAR systems may include, as an example, a range of up to 860 m (front) or 80 m (rear), and a field of view of up to 42 degrees (front) or 850 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 800 may further include ultrasonic sensor(s) 862. The ultrasonic sensor(s) 862, which may be positioned at the front, back, and/or the sides of the vehicle 800, may be used for park assist and/or to create and update an occupancy grid. A wide variety of ultrasonic sensor(s) 862 may be used, and different ultrasonic sensor(s) 862 may be used for different ranges of detection (e.g., 2.5 m, 4 m). The ultrasonic sensor(s) 862 may operate at functional safety levels of ASIL B.

The vehicle 800 may include LIDAR sensor(s) 864. The LIDAR sensor(s) 864 may be used for object and pedestrian detection, emergency braking, collision avoidance, and/or other functions. The LIDAR sensor(s) 864 may be functional safety level ASIL B. In some examples, the vehicle 800 may include multiple LIDAR sensors 864 (e.g., two, four, six, etc.) that may use Ethernet (e.g., to provide data to a Gigabit Ethernet switch).

In some examples, the LIDAR sensor(s) 864 may be capable of providing a list of objects and their distances for a 360-degree field of view. Commercially available LIDAR sensor(s) 864 may have an advertised range of approximately 800 m, with an accuracy of 2 cm-3 cm, and with support for a 800 Mbps Ethernet connection, for example. In some examples, one or more non-protruding LIDAR sensors 864 may be used. In such examples, the LIDAR sensor(s) 864 may be implemented as a small device that may be embedded into the front, rear, sides, and/or corners of the vehicle 800. The LIDAR sensor(s) 864, in such examples, may provide up to a 120-degree horizontal and 35-degree vertical field-of-view, with a 200 m range even for low-reflectivity objects. Front-mounted LIDAR sensor(s) 864 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 800. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 864 may be less susceptible to motion blur, vibration, and/or shock.

The vehicle may further include IMU sensor(s) 866. The IMU sensor(s) 866 may be located at a center of the rear axle of the vehicle 800, in some examples. The IMU sensor(s) 866 may include, for example and without limitation, an accelerometer(s), a magnetometer(s), a gyroscope(s), a magnetic compass(es), and/or other sensor types. In some examples, such as in six-axis applications, the IMU sensor(s) 866 may include accelerometers and gyroscopes, while in nine-axis applications, the IMU sensor(s) 866 may include accelerometers, gyroscopes, and magnetometers.

In some embodiments, the IMU sensor(s) 866 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 866 may enable the vehicle 800 to estimate heading without requiring input from a magnetic sensor by directly observing and correlating the changes in velocity from GPS to the IMU sensor(s) 866. In some examples, the IMU sensor(s) 866 and the GNSS sensor(s) 858 may be combined in a single integrated unit.

The vehicle may include microphone(s) 896 placed in and/or around the vehicle 800. The microphone(s) 896 may be used for emergency vehicle detection and identification, among other things.

The vehicle may further include any number of camera types, including stereo camera(s) 868, wide-view camera(s) 870, infrared camera(s) 872, surround camera(s) 874, long-range and/or mid-range camera(s) 898, and/or other camera types. The cameras may be used to capture image data around an entire periphery of the vehicle 800. The types of cameras used depends on the embodiments and requirements for the vehicle 800, and any combination of camera types may be used to provide the necessary coverage around the vehicle 800. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 8A and FIG. 8B.

The vehicle 800 may further include vibration sensor(s) 842. The vibration sensor(s) 842 may measure vibrations of components of the vehicle, such as the axle(s). For example, changes in vibrations may indicate a change in road surfaces. In another example, when two or more vibration sensors 842 are used, the differences between the vibrations may be used to determine friction or slippage of the road surface (e.g., when the difference in vibration is between a power-driven axle and a freely rotating axle).

The vehicle 800 may include an ADAS system 838. The ADAS system 838 may include a SoC, in some examples. The ADAS system 838 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 860, LIDAR sensor(s) 864, and/or a camera(s). The ACC systems may include longitudinal ACC and/or lateral ACC. Longitudinal ACC monitors and controls the distance to the vehicle immediately ahead of the vehicle 800 and automatically adjust the vehicle speed to maintain a safe distance from vehicles ahead. Lateral ACC performs distance keeping, and advises the vehicle 800 to change lanes when necessary. Lateral ACC is related to other ADAS applications such as LCA and CWS.

CACC uses information from other vehicles that may be received via the network interface 824 and/or the wireless antenna(s) 826 from other vehicles via a wireless link, or indirectly, over a network connection (e.g., over the Internet). Direct links may be provided by a vehicle-to-vehicle (V2V) communication link, while indirect links may be infrastructure-to-vehicle (12V) communication link. In general, the V2V communication concept provides information about the immediately preceding vehicles (e.g., vehicles immediately ahead of and in the same lane as the vehicle 800), while the 12V communication concept provides information about traffic further ahead. CACC systems may include either or both I2V and V2V information sources. Given the information of the vehicles ahead of the vehicle 800, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 860, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 860, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 800 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 800 if the vehicle 800 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 860, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 800 is backing up. Some RCTW systems include AEB to ensure that the vehicle brakes are applied to avoid a crash. RCTW systems may use one or more rear-facing RADAR sensor(s) 860, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 800, the vehicle 800 itself must, in the case of conflicting results, decide whether to heed the result from a primary computer or a secondary computer (e.g., a first controller 836 or a second controller 836). For example, in some embodiments, the ADAS system 838 may be a backup and/or secondary computer for providing perception information to a backup computer rationality module. The backup computer rationality monitor may run a redundant diverse software on hardware components to detect faults in perception and dynamic driving tasks. Outputs from the ADAS system 838 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 804.

In other examples, ADAS system 838 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 838 may be fed into the primary computer's perception block and/or the primary computer's dynamic driving task block. For example, if the ADAS system 838 indicates a forward crash warning due to an object immediately ahead, the perception block may use this information when identifying objects. In other examples, the secondary computer may have its own neural network which is trained and thus reduces the risk of false positives, as described herein.

The vehicle 800 may further include the infotainment SoC 830 (e.g., an in-vehicle infotainment system (IVI)). Although illustrated and described as a SoC, the infotainment system may not be a SoC, and may include two or more discrete components. The infotainment SoC 830 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 800. For example, the infotainment SoC 830 may radios, disk players, navigation systems, video players, USB and Bluetooth connectivity, carputers, in-car entertainment, Wi-Fi, steering wheel audio controls, hands free voice control, a heads-up display (HUD), an HMI display 834, a telematics device, a control panel (e.g., for controlling and/or interacting with various components, features, and/or systems), and/or other components. The infotainment SoC 830 may further be used to provide information (e.g., visual and/or audible) to a user(s) of the vehicle, such as information from the ADAS system 838, autonomous driving information such as planned vehicle maneuvers, trajectories, surrounding environment information (e.g., intersection information, vehicle information, road information, etc.), and/or other information.

The infotainment SoC 830 may include GPU functionality. The infotainment SoC 830 may communicate over the bus 802 (e.g., CAN bus, Ethernet, etc.) with other devices, systems, and/or components of the vehicle 800. In some examples, the infotainment SoC 830 may be coupled to a supervisory MCU such that the GPU of the infotainment system may perform some self-driving functions in the event that the primary controller(s) 836 (e.g., the primary and/or backup computers of the vehicle 800) fail. In such an example, the infotainment SoC 830 may put the vehicle 800 into a chauffeur to safe stop mode, as described herein.

The vehicle 800 may further include an instrument cluster 832 (e.g., a digital dash, an electronic instrument cluster, a digital instrument panel, etc.). The instrument cluster 832 may include a controller and/or supercomputer (e.g., a discrete controller or supercomputer). The instrument cluster 832 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 830 and the instrument cluster 832. In other words, the instrument cluster 832 may be included as part of the infotainment SoC 830, or vice versa.

Figure 8D:
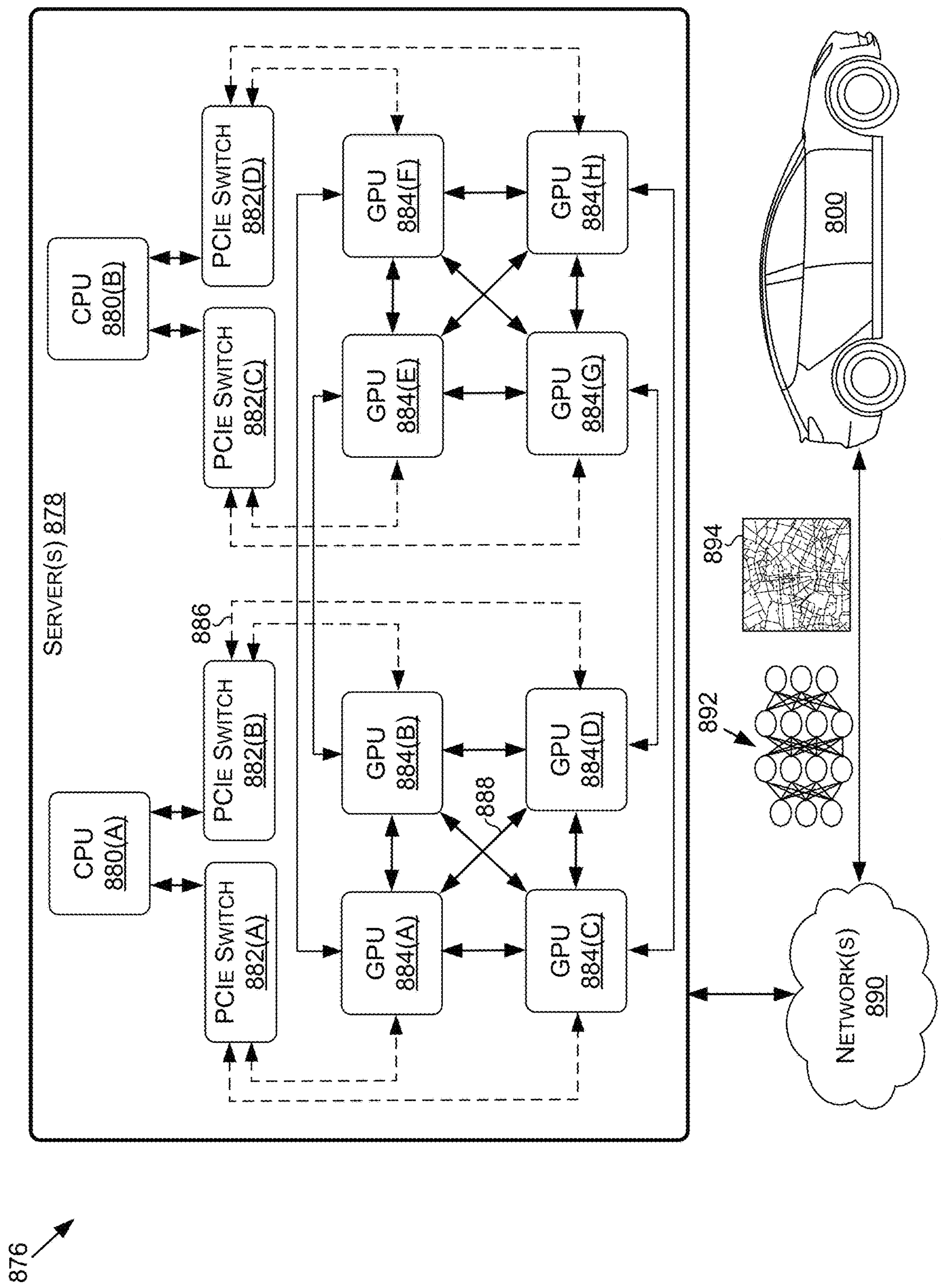
FIG. 8D is a system diagram for communication between cloud-based server(s) and the example autonomous vehicle of FIG. 8A, in accordance with some embodiments of the present disclosure.

FIG. 8D is a system diagram for communication between cloud-based server(s) and the example autonomous vehicle 800 of FIG. 8A, in accordance with some embodiments of the present disclosure. The system 876 may include server(s) 878, network(s) 890, and vehicles, including the vehicle 800. The server(s) 878 may include a plurality of GPUs 884(A)-884(H) (collectively referred to herein as GPUs 884), PCIe switches 882(A)-882(H) (collectively referred to herein as PCIe switches 882), and/or CPUs 880(A)-880(B) (collectively referred to herein as CPUs 880). The GPUs 884, the CPUs 880, and the PCIe switches may be interconnected with high-speed interconnects such as, for example and without limitation, NVLink interfaces 888 developed by NVIDIA and/or PCIe connections 886. In some examples, the GPUs 884 are connected via NVLink and/or NVSwitch SoC and the GPUs 884 and the PCIe switches 882 are connected via PCIe interconnects. Although eight GPUs 884, two CPUs 880, and two PCIe switches are illustrated, this is not intended to be limiting. Depending on the embodiment, each of the server(s) 878 may include any number of GPUs 884, CPUs 880, and/or PCIe switches. For example, the server(s) 878 may each include eight, sixteen, thirty-two, and/or more GPUs 884.

The server(s) 878 may receive, over the network(s) 890 and from the vehicles, image data representative of images showing unexpected or changed road conditions, such as recently commenced road-work. The server(s) 878 may transmit, over the network(s) 890 and to the vehicles, neural networks 892, updated neural networks 892, and/or map information 894, including information regarding traffic and road conditions. The updates to the map information 894 may include updates for the HD map 822, such as information regarding construction sites, potholes, detours, flooding, and/or other obstructions. In some examples, the neural networks 892, the updated neural networks 892, and/or the map information 894 may have resulted from new training and/or experiences represented in data received from any number of vehicles in the environment, and/or based on training performed at a datacenter (e.g., using the server(s) 878 and/or other servers).

The server(s) 878 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 890, and/or the machine learning models may be used by the server(s) 878 to remotely monitor the vehicles.

In some examples, the server(s) 878 may receive data from the vehicles and apply the data to up-to-date real-time neural networks for real-time intelligent inferencing. The server(s) 878 may include deep-learning supercomputers and/or dedicated AI computers powered by GPU(s) 884, such as a DGX and DGX Station machines developed by NVIDIA. However, in some examples, the server(s) 878 may include deep learning infrastructure that use only CPU-powered datacenters.

The deep-learning infrastructure of the server(s) 878 may be capable of fast, real-time inferencing, and may use that capability to evaluate and verify the health of the processors, software, and/or associated hardware in the vehicle 800. For example, the deep-learning infrastructure may receive periodic updates from the vehicle 800, such as a sequence of images and/or objects that the vehicle 800 has located in that sequence of images (e.g., via computer vision and/or other machine learning object classification techniques). The deep-learning infrastructure may run its own neural network to identify the objects and compare them with the objects identified by the vehicle 800 and, if the results do not match and the infrastructure concludes that the AI in the vehicle 800 is malfunctioning, the server(s) 878 may transmit a signal to the vehicle 800 instructing a fail-safe computer of the vehicle 800 to assume control, notify the passengers, and complete a safe parking maneuver.

For inferencing, the server(s) 878 may include the GPU(s) 884 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 9:
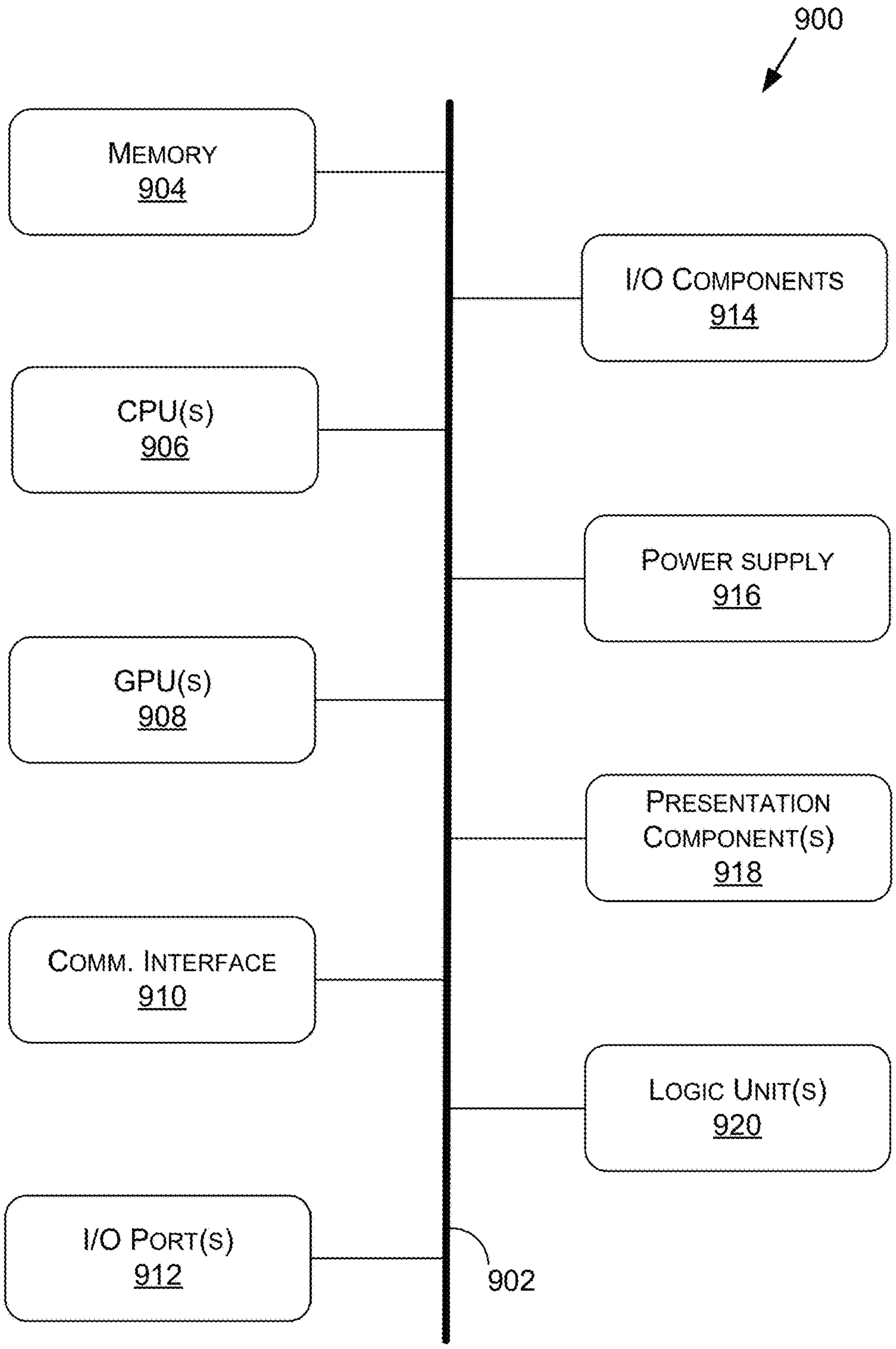
FIG. 9 is a block diagram of an example computing device suitable for use in implementing some embodiments of the present disclosure.

FIG. 9 is a block diagram of an example computing device(s) 900 suitable for use in implementing some embodiments of the present disclosure. Computing device 900 may include an interconnect system 902 that directly or indirectly couples the following devices: memory 904, one or more central processing units (CPUs) 906, one or more graphics processing units (GPUs) 908, a communication interface 910, input/output (I/O) ports 912, input/output components 914, a power supply 916, one or more presentation components 918 (e.g., display(s)), and one or more logic units 920. In at least one embodiment, the computing device(s) 900 may comprise one or more virtual machines (VMs), and/or any of the components thereof may comprise virtual components (e.g., virtual hardware components). For non-limiting examples, one or more of the GPUs 908 may comprise one or more vGPUs, one or more of the CPUs 906 may comprise one or more vCPUs, and/or one or more of the logic units 920 may comprise one or more virtual logic units. As such, a computing device(s) 900 may include discrete components (e.g., a full GPU dedicated to the computing device 900), virtual components (e.g., a portion of a GPU dedicated to the computing device 900), or a combination thereof.

Although the various blocks of FIG. 9 are shown as connected via the interconnect system 902 with lines, this is not intended to be limiting and is for clarity only. For example, in some embodiments, a presentation component 918, such as a display device, may be considered an I/O component 914 (e.g., if the display is a touch screen). As another example, the CPUs 906 and/or GPUs 908 may include memory (e.g., the memory 904 may be representative of a storage device in addition to the memory of the GPUs 908, the CPUs 906, and/or other components). In other words, the computing device of FIG. 9 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 9.

The interconnect system 902 may represent one or more links or busses, such as an address bus, a data bus, a control bus, or a combination thereof. The interconnect system 902 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 906 may be directly connected to the memory 904. Further, the CPU 906 may be directly connected to the GPU 908. Where there is direct, or point-to-point connection between components, the interconnect system 902 may include a PCIe link to carry out the connection. In these examples, a PCI bus need not be included in the computing device 900.

The memory 904 may include any of a variety of computer-readable media. The computer-readable media may be any available media that may be accessed by the computing device 900. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 904 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 900. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 906 may be configured to execute at least some of the computer-readable instructions to control one or more components of the computing device 900 to perform one or more of the methods and/or processes described herein. The CPU(s) 906 may each include one or more cores (e.g., one, two, four, eight, twenty-eight, seventy-two, etc.) that are capable of handling a multitude of software threads simultaneously. The CPU(s) 906 may include any type of processor, and may include different types of processors depending on the type of computing device 900 implemented (e.g., processors with fewer cores for mobile devices and processors with more cores for servers). For example, depending on the type of computing device 900, the processor may be an Advanced RISC Machines (ARM) processor implemented using Reduced Instruction Set Computing (RISC) or an x86 processor implemented using Complex Instruction Set Computing (CISC). The computing device 900 may include one or more CPUs 906 in addition to one or more microprocessors or supplementary co-processors, such as math co-processors.

In addition to or alternatively from the CPU(s) 906, the GPU(s) 908 may be configured to execute at least some of the computer-readable instructions to control one or more components of the computing device 900 to perform one or more of the methods and/or processes described herein. One or more of the GPU(s) 908 may be an integrated GPU (e.g., with one or more of the CPU(s) 906 and/or one or more of the GPU(s) 908 may be a discrete GPU. In embodiments, one or more of the GPU(s) 908 may be a coprocessor of one or more of the CPU(s) 906. The GPU(s) 908 may be used by the computing device 900 to render graphics (e.g., 3D graphics) or perform general purpose computations. For example, the GPU(s) 908 may be used for General-Purpose computing on GPUs (GPGPU). The GPU(s) 908 may include hundreds or thousands of cores that are capable of handling hundreds or thousands of software threads simultaneously. The GPU(s) 908 may generate pixel data for output images in response to rendering commands (e.g., rendering commands from the CPU(s) 906 received via a host interface). The GPU(s) 908 may include graphics memory, such as display memory, for storing pixel data or any other suitable data, such as GPGPU data. The display memory may be included as part of the memory 904. The GPU(s) 908 may include two or more GPUs operating in parallel (e.g., via a link). The link may directly connect the GPUs (e.g., using NVLINK) or may connect the GPUs through a switch (e.g., using NVSwitch). When combined together, each GPU 908 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 906 and/or the GPU(s) 908, the logic unit(s) 920 may be configured to execute at least some of the computer-readable instructions to control one or more components of the computing device 900 to perform one or more of the methods and/or processes described herein. In embodiments, the CPU(s) 906, the GPU(s) 908, and/or the logic unit(s) 920 may discretely or jointly perform any combination of the methods, processes and/or portions thereof. One or more of the logic units 920 may be part of and/or integrated in one or more of the CPU(s) 906 and/or the GPU(s) 908 and/or one or more of the logic units 920 may be discrete components or otherwise external to the CPU(s) 906 and/or the GPU(s) 908. In embodiments, one or more of the logic units 920 may be a coprocessor of one or more of the CPU(s) 906 and/or one or more of the GPU(s) 908.

Examples of the logic unit(s) 920 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Trec Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 910 may include one or more receivers, transmitters, and/or transceivers that enable the computing device 900 to communicate with other computing devices via an electronic communication network, included wired and/or wireless communications. The communication interface 910 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 920 and/or communication interface 910 may include one or more data processing units (DPUs) to transmit data received over a network and/or through interconnect system 902 directly to (e.g., a memory of) one or more GPU(s) 908.

The I/O ports 912 may enable the computing device 900 to be logically coupled to other devices including the I/O components 914, the presentation component(s) 918, and/or other components, some of which may be built in to (e.g., integrated in) the computing device 900. Illustrative I/O components 914 include a microphone, mouse, keyboard, joystick, game pad, game controller, satellite dish, scanner, printer, wireless device, etc. The I/O components 914 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 900. The computing device 900 may be include depth cameras, such as stereoscopic camera systems, infrared camera systems, RGB camera systems, touchscreen technology, and combinations of these, for gesture detection and recognition. Additionally, the computing device 900 may include accelerometers or gyroscopes (e.g., as part of an inertia measurement unit (IMU)) that enable detection of motion. In some examples, the output of the accelerometers or gyroscopes may be used by the computing device 900 to render immersive augmented reality or virtual reality.

The power supply 916 may include a hard-wired power supply, a battery power supply, or a combination thereof. The power supply 916 may provide power to the computing device 900 to enable the components of the computing device 900 to operate.

The presentation component(s) 918 may include a display (e.g., a monitor, a touch screen, a television screen, a heads-up-display (HUD), other display types, or a combination thereof), speakers, and/or other presentation components. The presentation component(s) 918 may receive data from other components (e.g., the GPU(s) 908, the CPU(s) 906, DPUs, etc.), and output the data (e.g., as an image, video, sound, etc.).

Example Data Center

Figure 10:
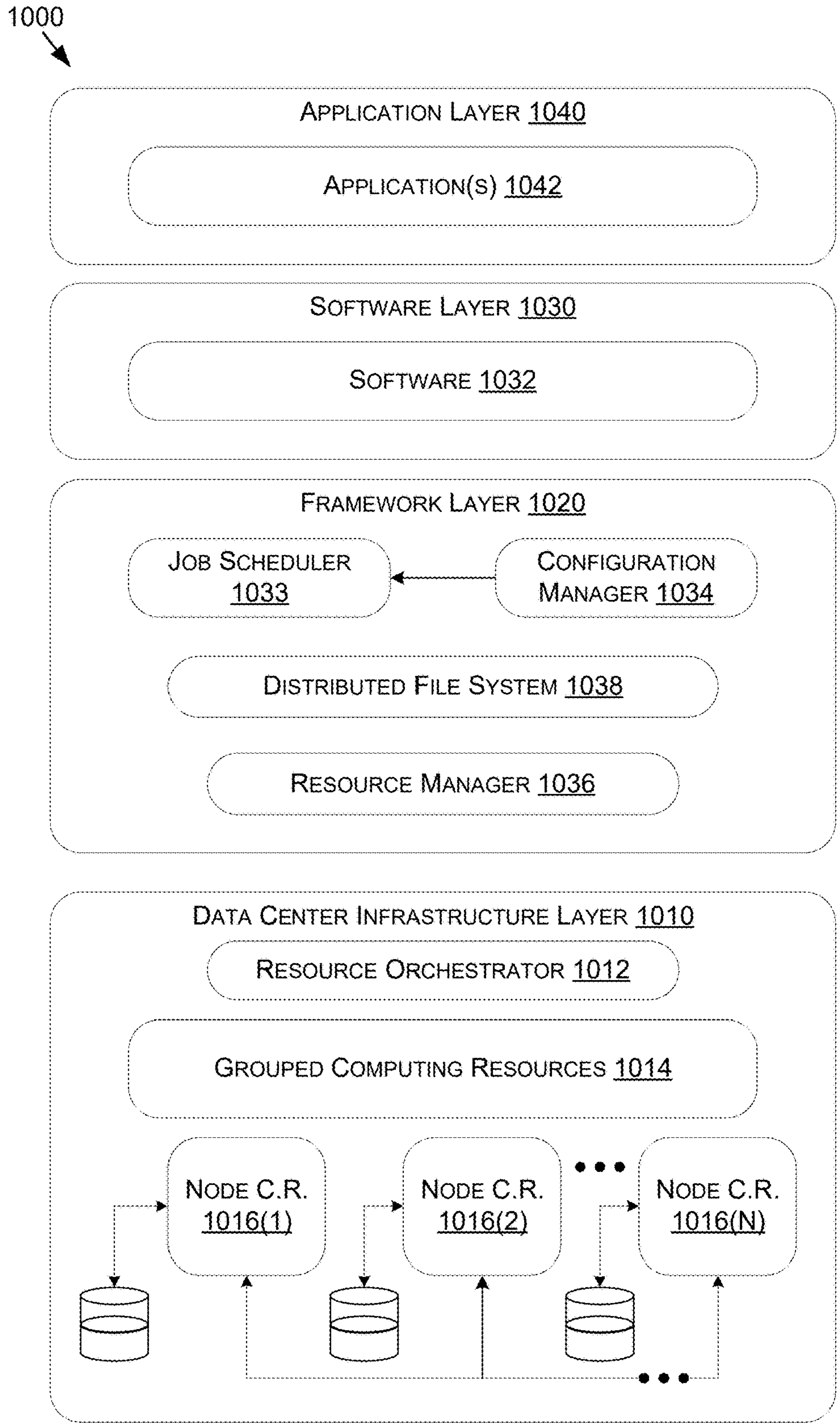
FIG. 10 is a block diagram of an example data center suitable for use in implementing some embodiments of the present disclosure.

FIG. 10 illustrates an example data center 1000 that may be used in at least one embodiments of the present disclosure. The data center 1000 may include a data center infrastructure layer 1010, a framework layer 1020, a software layer 1030, and/or an application layer 1040.

As shown in FIG. 10, the data center infrastructure layer 1010 may include a resource orchestrator 1012, grouped computing resources 1014, and node computing resources ("node C.R.s") 1016(1)-1016(N), where "N" represents any whole, positive integer. In at least one embodiment, node C.R.s 1016(1)-1016(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1016(1)-1016(N) may correspond to a server having one or more of the above-mentioned computing resources. In addition, in some embodiments, the node C.R.s 1016(1)-10161 (N) may include one or more virtual components, such as vGPUs, vCPUs, and/or the like, and/or one or more of the node C.R.s 1016(1)-1016(N) may correspond to a virtual machine (VM).

In at least one embodiment, grouped computing resources 1014 may include separate groupings of node C.R.s 1016 housed within one or more racks (not shown), or many racks housed in data centers at various geographical locations (also not shown). Separate groupings of node C.R.s 1016 within grouped computing resources 1014 may include grouped compute, network, memory or storage resources that may be configured or allocated to support one or more workloads. In at least one embodiment, several node C.R.s 1016 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1012 may configure or otherwise control one or more node C.R.s 1016(1)-1016(N) and/or grouped computing resources 1014. In at least one embodiment, resource orchestrator 1012 may include a software design infrastructure (SDI) management entity for the data center 1000. The resource orchestrator 1012 may include hardware, software, or some combination thereof.

In at least one embodiment, as shown in FIG. 10, framework layer 1020 may include a job scheduler 1033, a configuration manager 1034, a resource manager 1036, and/or a distributed file system 1038. The framework layer 1020 may include a framework to support software 1032 of software layer 1030 and/or one or more application(s) 1042 of application layer 1040. The software 1032 or application(s) 1042 may respectively include web-based service software or applications, such as those provided by Amazon Web Services, Google Cloud and Microsoft Azure. The framework layer 1020 may be, but is not limited to, a type of free and open-source software web application framework such as Apache Spark™ (hereinafter "Spark") that may utilize distributed file system 1038 for large-scale data processing (e.g., "big data"). In at least one embodiment, job scheduler 1033 may include a Spark driver to facilitate scheduling of workloads supported by various layers of data center 1000. The configuration manager 1034 may be capable of configuring different layers such as software layer 1030 and framework layer 1020 including Spark and distributed file system 1038 for supporting large-scale data processing. The resource manager 1036 may be capable of managing clustered or grouped computing resources mapped to or allocated for support of distributed file system 1038 and job scheduler 1033. In at least one embodiment, clustered or grouped computing resources may include grouped computing resource 1014 at data center infrastructure layer 1010. The resource manager 1036 may coordinate with resource orchestrator 1012 to manage these mapped or allocated computing resources.

In at least one embodiment, software 1032 included in software layer 1030 may include software used by at least portions of node C.R.s 1016(1)-1016(N), grouped computing resources 1014, and/or distributed file system 1038 of framework layer 1020. One or more types of software may include, but are not limited to, Internet web page search software, e-mail virus scan software, database software, and streaming video content software.

In at least one embodiment, application(s) 1042 included in application layer 1040 may include one or more types of applications used by at least portions of node C.R.s 1016 (1)-1016 (N), grouped computing resources 1014, and/or distributed file system 1038 of framework layer 1020. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1034, resource manager 1036, and resource orchestrator 1012 may implement any number and type of self-modifying actions based on any amount and type of data acquired in any technically feasible fashion. Self-modifying actions may relieve a data center operator of data center 1000 from making possibly bad configuration decisions and possibly avoiding underutilized and/or poor performing portions of a data center.

The data center 1000 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1000. In at least one embodiment, trained or deployed machine learning models corresponding to one or more neural networks may be used to infer or predict information using resources described above with respect to the data center 1000 by using weight parameters calculated through one or more training techniques, such as but not limited to those described herein.

In at least one embodiment, the data center 1000 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 900 of FIG. 9—e.g., each device may include similar components, features, and/or functionality of the computing device(s) 900. In addition, where backend devices (e.g., servers, NAS, etc.) are implemented, the backend devices may be included as part of a data center 1000, an example of which is described in more detail herein with respect to FIG. 10.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 900 described herein with respect to FIG. 9. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Example Paragraphs

A. A method comprising: determining one or more first state vectors associated with one or more first Kalman filters, the one or more first state vectors including one or more first values corresponding to one or more first Bezier representations associated with one or more first portions of one or more paths; determining one or more second state vectors associated with one or more second Kalman filters, the one or more second state vectors including one or more second values corresponding to one or more second Bezier representations associated with one or more second portions of the one or more paths; computing one or more geometries associated with the one or more paths based at least on the one or more first state vectors, the one or more second state vectors, and data indicating at least a relative motion associated with a machine; and causing the machine to perform one or more operations based at least on the one or more geometries associated with the one or more paths.

B. The method as recited in paragraph A, wherein the one or more paths include at least a first path and one or more second paths, the first path corresponding to a first lane of a driving surface occupied by the machine and the one or more second paths corresponding to one or more second lanes of the driving surface.

C. The method as recited in any one of paragraphs A-B, wherein: the one or more first portions of the one or more paths correspond to at least one or more first edges associated with the first lane and one or more second edges associated with the one or more second lanes, and the one or more second portions of the one or more paths correspond to at least a first midline associated with the first lane and one or more second midlines associated with the one or more second lanes.

D. The method as recited in any one of paragraphs A-C, wherein the one or more first Bezier representations and the one or more second Bezier representations include at least one three-dimensional (3D) Bezier curve representative of a geometry associated with a portion of a path of the one or more paths.

E. The method as recited in any one of paragraphs A-D, wherein: the one or more first values included in the one or more first state vectors correspond to a first dimension associated with one or more 3D control points for the 3D Bezier curve, and the one or more second values included in the one or more second state vectors correspond to a second dimension associated with the one or more 3D control points for the 3D Bezier curve.

F. The method as recited in any one of paragraphs A-E, further comprising: applying, to one or more machine learning models, sensor data generated using one or more sensors associated with the machine, the sensor data indicative of at least the relative motion associated with the machine; determining one or more first updated state vectors based at least on updating the one or more first values using one or more first outputs of the one or more machine learning models; and determining one or more second updated state vectors based at least on updating the one or more second values using one or more second outputs of the one or more machine learning models, wherein the computing of the one or more geometries associated with the one or more paths is based at least on the one or more first updated state vectors and the one or more second updated state vectors.

G. A system comprising: one or more processors to: obtain one or more first points corresponding to one or more first Bezier representations associated with one or more paths in an environment; compute, based at least on the one or more first points and a relative motion associated with a machine, one or more second points corresponding to one or more second Bezier representations associated with the one or more paths; and perform one or more operations associated with the machine based at least on the one or more second Bezier representations.

H. The system as recited in paragraph G, wherein the one or more first Bezier representations and the one or more second Bezier representations correspond to one or more three-dimensional (3D) Bezier curves representative of one or more 3D geometries associated with the one or more paths.

I. The system as recited in any one of paragraphs G-H, wherein the one or more first Bezier representations include at least a first Bezier curve and one or more second Bezier curves, the first Bezier curve corresponding to a first portion of at least one path of the one or more paths and the one or more second Bezier curves corresponding to one or more second portions of the path.

J. The system as recited in any one of paragraphs G-I, wherein the first portion of the path is a midline associated with the path and the one or more second portions are one or more edges associated with the path.

K. The system as recited in any one of paragraphs G-J, wherein the one or more paths correspond to one or more lanes associated with a driving surface in the environment, the one or more lanes including at least a first lane and one or more second lanes.

L. The system as recited in any one of paragraphs G-K, wherein the one or more first Bezier representations are associated with one or more first portions of the one or more paths and the one or more second Bezier representations are associated with one or more second portions of the one or more paths.

M. The system as recited in any one of paragraphs G-L, wherein the obtainment of the one or more first points corresponding to the one or more first Bezier representations comprises: obtaining one or more first state vectors including one or more first values representing one or more first coordinate locations of the one or more first points with respect to a first dimension of a multi-dimensional space; and obtaining one or more second state vectors including one or more second values representing one or more second coordinate locations of the one or more first points with respect to a second dimension of the multi-dimensional space.

N. The system as recited in any one of paragraphs G-M, the one or more processors further to: apply, to one or more machine learning models, sensor data generated using one or more sensors associated with the machine; and compute, based at least on one or more outputs of the one or more machine learning models, one or more updated versions of the one or more second points corresponding to one or more updated Bezier representations associated with the one or more paths, wherein the performance of the one or more operations associated with the machine is further based at least on one or more updated Bezier representations.

O. The system as recited in any one of paragraphs G-N, wherein the one or more first Bezier representations include at least a first set of multi-dimensional Bezier curves corresponding to one or more first portions of a first path in the environment and one or more second sets of multi-dimensional Bezier curves corresponding to one or more second portions of one or more second paths in the environment.

P. The system as recited in any one of paragraphs G-O, the one or more processor further to: apply, to one or more values associated with the one or more first points, one or more shifting matrices determined based at least on one or more polyline points associated with the one or more first Bezier representations; and wherein the computation of the one or more second points is further based at least on the application of the one or more shifting matrices.

Q. The system as recited in any one of paragraphs G-P, wherein the system is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models; a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

R. At least one processor comprising: processing circuitry to perform one or more operations associated with a machine based at least on one or more curves associated with one or more portions of one or more paths in an environment, wherein the one or more curves are determined using one or more Kalman filters to at least one of track or predict one or more three-dimensional (3D) control coordinates corresponding to the one or more curves.

S. The processor as recited in paragraph R, wherein the one or more curves comprise at least: one or more first 3D Bezier curves representative of one or more first 3D geometries associated with a first path of the one or more paths; and one or more second 3D Bezier curves representative of one or more second 3D geometries associated with one or more second paths of the one or more paths.

T. The processor as recited in any one of paragraphs R-S, wherein the processor is comprised in at least one of: a control system for an autonomous or semi-autonomous machine; a perception system for an autonomous or semi-autonomous machine; a system for performing one or more simulation operations; a system for performing one or more digital twin operations; a system for performing light transport simulation; a system for performing collaborative content creation for 3D assets; a system for performing one or more deep learning operations; a system implemented using an edge device; a system implemented using a robot; a system for performing one or more generative AI operations; a system for performing operations using one or more large language models; a system for performing operations using one or more vision language models (VLMs); a system for performing operations using one or more multi-modal language models; a system for performing one or more conversational AI operations; a system for generating synthetic data; a system for presenting at least one of virtual reality content, augmented reality content, or mixed reality content; a system incorporating one or more virtual machines (VMs); a system implemented at least partially in a data center; or a system implemented at least partially using cloud computing resources.

What is claimed is:

1. A method comprising:

determining one or more first state vectors associated with one or more first Kalman filters, the one or more first state vectors including one or more first values corresponding to one or more first Bezier representations associated with one or more first portions of one or more paths;

determining one or more second state vectors associated with one or more second Kalman filters, the one or more second state vectors including one or more second values corresponding to one or more second Bezier representations associated with one or more second portions of the one or more paths;

computing one or more geometries associated with the one or more paths based at least on the one or more first state vectors, the one or more second state vectors, and data indicating at least a relative motion associated with a machine; and causing the machine to perform one or more operations based at least on the one or more geometries associated with the one or more paths.

2. The method of claim 1, wherein the one or more paths include at least a first path and one or more second paths, the first path corresponding to a first lane of a driving surface occupied by the machine and the one or more second paths corresponding to one or more second lanes of the driving surface.

3. The method of claim 2, wherein:

the one or more first portions of the one or more paths correspond to at least one or more first edges associated with the first lane and one or more second edges associated with the one or more second lanes, and the one or more second portions of the one or more paths correspond to at least a first midline associated with the first lane and one or more second midlines associated with the one or more second lanes.

4. The method of claim 1, wherein the one or more first Bezier representations and the one or more second Bezier representations include at least one three-dimensional (3D) Bezier curve representative of a geometry associated with a portion of a path of the one or more paths.

5. The method of claim 4, wherein:

the one or more first values included in the one or more first state vectors correspond to a first dimension associated with one or more 3D control points for the 3D Bezier curve, and the one or more second values included in the one or more second state vectors correspond to a second dimension associated with the one or more 3D control points for the 3D Bezier curve.

6. The method of claim 1, further comprising:

applying, to one or more machine learning models, sensor data generated using one or more sensors associated with the machine, the sensor data indicative of at least the relative motion associated with the machine;

determining one or more first updated state vectors based at least on updating the one or more first values using one or more first outputs of the one or more machine learning models; and determining one or more second updated state vectors based at least on updating the one or more second values using one or more second outputs of the one or more machine learning models, wherein the computing of the one or more geometries associated with the one or more paths is based at least on the one or more first updated state vectors and the one or more second updated state vectors.

7. A system comprising:

one or more processors to:

obtain one or more first points corresponding to one or more first Bezier representations associated with one or more paths in an environment;

compute, based at least on transforming the one or more first points according to a relative motion of a machine between a previous location of the machine and a current location of the machine, one or more second points corresponding to one or more second Bezier representations associated with the one or more paths; and perform one or more operations associated with the machine based at least on the one or more second Bezier representations.

8. The system of claim 7, wherein the one or more first Bezier representations and the one or more second Bezier representations correspond to one or more three-dimensional (3D) Bezier curves representative of one or more 3D geometries associated with the one or more paths.

9. The system of claim 7, wherein the one or more first Bezier representations include at least a first Bezier curve and one or more second Bezier curves, the first Bezier curve corresponding to a first portion of at least one path of the one or more paths and the one or more second Bezier curves corresponding to one or more second portions of the path.

10. The system of claim 9, wherein the first portion of the path is a midline associated with the path and the one or more second portions are one or more edges associated with the path.

11. The system of claim 7, wherein the one or more paths correspond to one or more lanes associated with a driving surface in the environment, the one or more lanes including at least a first lane and one or more second lanes.

12. The system of claim 7, wherein the obtainment of the one or more first points corresponding to the one or more first Bezier representations comprises:

obtaining one or more first state vectors including one or more first values representing one or more first coordinate locations of the one or more first points with respect to a first dimension of a multi-dimensional space; and obtaining one or more second state vectors including one or more second values representing one or more second coordinate locations of the one or more first points with respect to a second dimension of the multi-dimensional space.

13. The system of claim 7, wherein the one or more processors are further configured to:

apply, to one or more machine learning models, sensor data generated using one or more sensors associated with the machine; and compute, based at least on one or more outputs of the one or more machine learning models, one or more updated versions of the one or more second points corresponding to one or more updated Bezier representations associated with the one or more paths, wherein the performance of the one or more operations associated with the machine is further based at least on one or more updated Bezier representations.

14. The system of claim 7, wherein the one or more first Bezier representations include at least a first set of multi-dimensional Bezier curves corresponding to one or more first portions of a first path in the environment and one or more second sets of multi-dimensional Bezier curves corresponding to one or more second portions of one or more second paths in the environment.

15. The system of claim 7, wherein the one or more processors are further configured to:

apply, to one or more values associated with the one or more first points, one or more shifting matrices determined based at least on one or more polyline points associated with the one or more first Bezier representations, wherein the computation of the one or more second points is further based at least on the application of the one or more shifting matrices.

16. The system of claim 11, wherein the system is comprised in at least one of:

a control system for an autonomous or semi-autonomous machine;

a perception system for an autonomous or semi-autonomous machine;

a system for performing one or more simulation operations;

a system for performing one or more digital twin operations;

a system for performing light transport simulation;

a system for performing collaborative content creation for 3D assets;

a system for performing one or more deep learning operations;

a system implemented using an edge device;

a system implemented using a robot;

a system for performing one or more generative AI operations;

a system for performing operations using one or more large language models;

a system for performing operations using one or more vision language models (VLMs);
a system for performing operations using one or more multi-modal language models;
a system for performing one or more conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

17. At least one processor comprising:
processing circuitry to perform one or more operations associated with a machine based at least on one or more curves associated with one or more portions of one or more paths in an environment, wherein the one or more curves are determined using one or more Kalman filters configured to track or predict one or more three-dimensional (3D) control coordinates that define a geometry of the one or more curves.

18. The processor of claim 17, wherein the one or more curves comprise at least:
one or more first 3D Bezier curves representative of one or more first 3D geometries associated with a first path of the one or more paths; and
one or more second 3D Bezier curves representative of one or more second 3D geometries associated with one or more second paths of the one or more paths.

19. The processor of claim 17, wherein the processor is comprised in at least one of:
a control system for an autonomous or semi-autonomous machine;
a perception system for an autonomous or semi-autonomous machine;
a system for performing one or more simulation operations;
a system for performing one or more digital twin operations;
a system for performing light transport simulation;
a system for performing collaborative content creation for 3D assets;
a system for performing one or more deep learning operations;
a system implemented using an edge device;
a system implemented using a robot;
a system for performing one or more generative AI operations;
a system for performing operations using one or more large language models;
a system for performing operations using one or more vision language models (VLMs);
a system for performing operations using one or more multi-modal language models;
a system for performing one or more conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

20. The system of claim 7, wherein the one or more first points correspond to control points defining the one or more first Bezier representations associated with the one or more paths at the previous location of the machine.

* * * * *